(12) United States Patent
Shigeno et al.

(10) Patent No.: US 7,861,577 B2
(45) Date of Patent: Jan. 4, 2011

(54) ELECTRIC POTENTIAL DIFFERENCE DETECTION METHOD AND SCANNING PROBE MICROSCOPE

(75) Inventors: Masatsugu Shigeno, Chiba (JP); Akira Inoue, Chiba (JP)

(73) Assignee: Seiko Instruments Inc. (JP)

( * ) Notice: Subject to any disclaimer, the term of this patent is extended or adjusted under 35 U.S.C. 154(b) by 676 days.

(21) Appl. No.: 11/891,109

(22) Filed: Aug. 9, 2007

(65) Prior Publication Data
US 2008/0054928 A1 Mar. 6, 2008

(30) Foreign Application Priority Data
Aug. 30, 2006 (JP) .............................. 2006-234565

(51) Int. Cl.
*G01Q 90/00* (2010.01)
(52) U.S. Cl. ....................................................... 73/105
(58) Field of Classification Search .................... 73/105
See application file for complete search history.

(56) References Cited
U.S. PATENT DOCUMENTS 5,267,471 A * 12/1993 Abraham et al. .............. 73/105
5,723,981 A * 3/1998 Hellemans et al. .......... 324/719
6,005,246 A * 12/1999 Kitamura et al. .............. 850/21
6,073,485 A * 6/2000 Kitamura ...................... 73/105
6,097,197 A * 8/2000 Matsuyama et al. ......... 324/750
6,337,478 B1 * 1/2002 Uehara et al. ................ 250/216
6,507,197 B1 * 1/2003 Itoh et al. .................... 324/456

FOREIGN PATENT DOCUMENTS

| JP | 2002055040 | | 2/2002 |
| JP | 2002-195927 | * | 7/2002 |
| JP | 2003042931 | | 2/2003 |
| JP | 2004226237 | | 8/2004 |

* cited by examiner

*Primary Examiner*—Daniel S Larkin
(74) *Attorney, Agent, or Firm*—Adams & Wilks

(57) ABSTRACT

An electric potential difference detection method detects an electric potential difference between a surface of a sample and a probe of a cantilever in a scanning probe microscope. An AC voltage having a frequency that is ½ of a resonance frequency of the cantilever is applied between the sample and the cantilever, and a magnitude of an amplitude of vibration of the cantilever is detected. On the basis of the detection, a determination is made as to whether an electric potential difference exists or does not exist between the surface of the sample and the cantilever probe. A determination that an electric potential difference between the surface of the sample and the cantilever probe does not exist is made in a case where the cantilever is resonating and the detected magnitude of the amplitude of vibration of the cantilever is greater than a predetermined magnitude.

23 Claims, 13 Drawing Sheets

ELECTRIC POTENTIAL DIFFERENCE DETECTION METHOD AND SCANNING PROBE MICROSCOPE

BACKGROUND OF THE INVENTION

1. Field of the Invention

The present invention relates to a scanning probe microscope comprising a cantilever having in its tip a probe, and observing a sample, and an electric potential difference detection method detecting an electric potential difference occurring between a surface of the sample and the probe of the cantilever.

2. Description of the Related Art

As a device for performing an observation of a physical property information, such as surface shape or viscoelasticity, of the sample, and the like by measuring in a micro region of the sample of metal, semiconductor, ceramic, resin, high polymer, biomaterial, insulator and the like, there is known the scanning probe microscope (SPM: Scanning Probe Microscope). As the scanning probe microscope, there is an AFM (Atomic Force Mode), a DFM (Dynamic Force Mode) or the like. The AFM is one in which the probe formed in a tip part of a cantilever supported like a cantilever beam of a mounted probe is scanned on a surface of the sample, and a displacement quantity of the displaced probe is measured by the surface shape of the sample, thereby measuring the surface shape of the sample. Further, the DFM is one in which the above-mentioned cantilever is resonated and, by its amplitude change, phase change or frequency change, the surface shape of the sample is measured (e.g., refer to Patent Document 1: JP-A-2003-42931 Gazette).

Further, besides the scanning probe microscope like the above, as special ones, there are a Kelvin probe force microscope (e.g., refer to Patent Document 2: JP-A-2004-226237 Gazette), a scanning Maxwell stress microscope (e.g., refer to Patent Document 3: JP-A-2002-55040 Gazette), and the like. These comprises a lock-in amplifier capable of synchronously detecting a predetermined frequency component, and an electric potential measuring control circuit having an adder, an integrator and the like, and it is possible to analyze a surface electric potential image of the sample respectively by, in the former, finding such an amplitude output as to minimize a static electricity force between the probe and the sample and by, in the latter, finding such a DC voltage as to make an amplitude of the predetermined frequency component zero.

However, in the scanning probe microscope like the Patent Document 1, in such a case that the sample is electrified, the electric potential difference occurs between the surface of the sample and the probe of the cantilever, and it follows that the static electricity force by this electric field acts on the cantilever. Therefor, in the case like this, there is an issue that the electric potential difference exerts an influence on a displacement of the cantilever at a sample observation time and thus a measurement becomes impossible, or it becomes impossible to obtain an accurate observation image. In the case like this, although it is necessary to perform such an action as to dissolve the electric potential difference, there is a case where it is difficult to judge from an observation image obtained whether the observation image is accurate one or one undergoing the influence of the electric potential difference.

On the other hand, in the Kelvin probe force microscope of the Patent Document 2 and the scanning Maxwell stress microscope of the Patent Document 3, by comprising the lock-in amplifier and the electric potential measuring control circuit, it is possible to detect the electric potential difference like the above, and it is possible to dissolve the above issue. However, the constitution like this is not mounted in the scanning probe microscope like the Patent Document 1, in which the measurement is performed by the AFM, the DFM and the like. Therefor, in order to detect the electric potential difference by a method of the Patent Document 2 or the Patent Document 3, although it is necessary to mount the lock-in amplifier and the electric potential measuring control circuit, a device cost increases and, further suppositively even if they are mounted, it is necessary to perform a complicated measurement method, so that there is an issue that it takes a time.

SUMMARY OF THE INVENTION

This invention is one made in view of the above-mentioned circumstances, and one providing an electric potential difference detection method in which the electric potential difference between the surface of the sample and the probe of the cantilever can be easily and accurately detected, and a scanning probe microscope in which, by a simple constitution, the sample can be accurately observed by easily and accurately detecting the electric potential difference between the surface of the sample and the probe of the cantilever.

In order to solve the above problems, this invention proposes the following means.

The present invention is an electric potential difference detection method detecting, by a scanning probe microscope comprising a cantilever having in its tip a probe and supported like a cantilever to a mounting base in its main body part of a base end, and a sample base mounting a sample so as to face on the probe of the cantilever, an electric potential difference occurring between a surface of the sample and the probe of the cantilever, wherein it comprises a voltage application process * applying, between the sample and the cantilever, an AC voltage of a frequency becoming ½ of a resonance frequency of the cantilever, a detection process detecting, following upon the voltage application process, vibration characteristics of the cantilever, and an analysis process judging, on the basis of the vibration characteristics of the cantilever, an existence/nonexistence of the electric potential difference between the surface of the sample and the probe of the cantilever.

Further, a scanning probe microscope of the present invention comprises a cantilever having in its tip a probe, a mounting base supporting the cantilever like a cantilever by a main body part of a base end of the cantilever, a sample base mounting a sample so as to face on the probe of the cantilever, a movement member relatively moving the sample and the cantilever, a measurement member capable of detecting a displacement and vibration characteristics of the cantilever, a controller collecting an observation data of a surface of the sample on the basis of a detection result of the measurement member, and a voltage application member capable of applying an AC voltage between the sample and the cantilever, wherein prior to a collection of the observation data of the surface of the sample, the controller causes an AC voltage to be applied at a frequency of ½ of a resonance frequency of the cantilever by the voltage application member and judges, on the basis of the vibration characteristics, of the cantilever, detected by the measurement member, an existence/nonexistence of an electric potential difference between the surface of the sample and the probe of the cantilever, thereby starting the collection of the observation data in a case where there is judged that the electric potential difference does not exist.

According to the electric potential difference detection method and the scanning probe microscope, which are concerned with this invention, prior to an observation of the surface of the sample, first as the voltage application process, the controller applies the AC voltage of the frequency becoming ½ of the resonance frequency of the cantilever between the surface of the sample and the cantilever by the voltage application member. By this, between the surface of the sample and the probe of the cantilever, a periodic electrostatic attraction force acts by the applied AC voltage. On this occasion, in a case where the electric potential difference does not occur between the surface of the sample and probe of the cantilever, it follows that the electrostatic attraction force generates only by the AC voltage and, when an absolute value of the AC voltage becomes greatest at each of a time in which the AC voltage is plus and a time in which it is minus, it acts so as to show a greatest value. That is, since it follows that the electrostatic attraction force acts at a frequency of two times of the AC voltage by the voltage application member, it follows that the cantilever resonates. On the other hand, in a case where the electric potential difference occurs between the surface of the sample and probe of the cantilever, the electrostatic attraction force generates by the electric potential difference of a sum of the AC voltage and an initial electric potential difference, and it shows different values at the time in which the AC voltage is plus and the time in which it is minus. That is, the cantilever does not resonate because it vibrates at the same frequency as the frequency of the AC voltage, ½ of the resonance frequency. Therefor, by detecting in the detection process the vibration characteristics of the cantilever by the measurement member, and judging in the analysis process whether the cantilever resonates on the basis of the vibration characteristics of the cantilever, it is possible to easily and accurately judge whether the electric potential difference occurs. Further, by the fact that it is possible to judge whether the electric potential difference occurs, it becomes possible to accurately perform the observation of the sample after it.

Further, in the above electric potential difference detection method, it is deemed to be more desirable that the detection process detects a magnitude of an amplitude as the vibration characteristics of the cantilever, and the analysis process judges that the electric potential difference does not exist between the surface of the sample and the probe of the cantilever in a case where a detected vibration amplitude of the cantilever is larger than a predetermined magnitude and the cantilever is resonating.

Further, in the above electric potential difference detection method, there may be made one in which the detection process detects a magnitude of an amplitude as vibration characteristics of the cantilever, and the analysis process judges that the electric potential difference exists between the surface of the sample and the probe of the cantilever in a case where a detected vibration amplitude of the cantilever is smaller than a predetermined magnitude and the cantilever is not resonating.

Further, in the above scanning probe microscope, it is deemed to be more desirable that the measurement member can detect a magnitude of an amplitude as the vibration characteristics of the cantilever, and in a case where a vibration amplitude of the cantilever is above a predetermined magnitude and the cantilever is resonating, the controller judges that the electric potential difference does not exist between the surface of the sample and the probe of the cantilever, thereby starting the collection of the observation data.

According to the electric potential difference detection method and the scanning probe microscope, which are concerned with this invention, in a case where the cantilever resonates, the vibration amplitude of the cantilever becomes extremely large. That is by detecting in the detection process the magnitude of the amplitude as the vibration characteristics of the cantilever, and comparing in the analysis process whether it becomes larger than the predetermined magnitude, it is possible to clearly judge whether the cantilever resonates and, by this, it is possible to easily and accurately judge an existence/nonexistence of the electric potential difference between the surface of the sample and the probe of the cantilever. Incidentally, on the occasion of the detection of the electric potential difference, although there are a method of judging that the electric potential difference does not exist on the basis of the fact that the cantilever resonates, and a method of judging that the electric potential difference exists on the basis of the fact that the cantilever does not resonate, rather the former is more desirable in a point that there is not judged erroneously that the electric potential difference does not exists even in a case where the electrostatic attraction force is small and the amplitude becomes small even if resonating.

Further, in the above electric potential difference detection method, there may be made one in which the detection process detects a frequency as vibration characteristics of the cantilever, and the analysis process judges that the electric potential difference exists between the surface of the sample and the probe of the cantilever in a case where a detected vibration frequency of the cantilever is not a resonance frequency of the cantilever and the cantilever is not resonating.

Further, in the above scanning probe microscope, there may be made one in which the measurement member can detect a frequency as the vibration characteristics of the cantilever, and in a case where a vibration amplitude of the cantilever is a resonance frequency of the cantilever and the cantilever is resonating, the controller judges that the electric potential difference does not exist between the surface of the sample and the probe of the cantilever, thereby starting the collection of the observation data.

According to the electric potential difference detection method and the scanning probe microscope, which are concerned with this invention, in the case where the cantilever resonates, the cantilever vibrates at the resonance frequency. That is, by detecting in the detection process the frequency as the vibration characteristics of the cantilever, and comparing in the analysis process whether the vibration frequency of the cantilever is the resonance frequency, it is possible to judge whether the cantilever resonates and, by this, it is possible to easily and accurately judge the existence/nonexistence of the electric potential difference between the surface of the sample and the probe of the cantilever.

Further, in the above electric potential difference detection method, it is deemed to be more desirable that in a case where, in the analysis process, there is judged that the electric potential difference exists between the surface of the sample and the probe of the cantilever, an amplitude of the AC voltage in the voltage application process is gradually increased, thereby repeatedly performing the voltage application process, the detection process and the analysis process, and the analysis process extracts a magnitude of the amplitude of the AC voltage applied in the voltage application process in final as the electric potential difference between the surface of the sample and the probe of the cantilever in a case where a composite wave of plural waveforms whose amplitudes differ is detected in a vibration waveform of the cantilever in the detection process.

Further, in the above scanning probe microscope, it is deemed to be more desirable that in a case where the controller judges, on the basis of the vibration characteristics of the cantilever, that the electric potential difference exists between the surface of the sample and the probe of the cantilever, it causes an amplitude of the AC voltage applied by the voltage application member to gradually increase, thereby causing the vibration characteristics of the cantilever to be repeatedly detected by the measurement member, and, in a case where a composite wave of plural waveforms whose amplitudes differ is detected in a vibration waveform of the cantilever, it extracts a magnitude of the amplitude of the AC voltage finally applied by the voltage application member as the electric potential difference between the surface of the sample and the probe of the cantilever.

According to the electric potential difference detection method and the scanning probe microscope, which are concerned with this invention, in a case where the electric potential difference occurs between the surface of the sample and the probe of the cantilever and that electric potential difference is smaller than the amplitude of the AC voltage applied by the voltage application member in the voltage application process, the electrostatic attraction force shows maximum values of magnitudes respectively different at the time in which the AC voltage is plus and the time in which it is minus. Therefor, the vibration waveform of the cantilever becomes the composite wave of plural waveforms whose amplitudes differ. That is, by repeatedly performing the voltage application process, the detection process and the analysis process, and extracting the magnitude of the amplitude of the final AC voltage in a case where the composite wave is started to be detected as the vibration waveform, it is possible to quantitatively detect the electric potential difference between the surface of the sample and the probe of the cantilever.

Further, in the above electric potential difference detection method, there may be made one in which in a case where, in the analysis process, there is judged that the electric potential difference exists between the surface of the sample and the probe of the cantilever, a DC voltage is applied together with the AC voltage in the voltage application process and the DC voltage is gradually changed, thereby repeatedly performing the voltage application process, the detection process and the analysis process, and the analysis process extracts a sum of a magnitude of the DC voltage applied in the voltage application process in final and a magnitude of the amplitude of the AC voltage as the electric potential difference between the surface of the sample and the probe of the cantilever in a case where a composite wave of plural waveforms whose amplitudes differ is detected in a vibration waveform of the cantilever in the detection process.

Further, in the above scanning probe microscope, there may be made one in which the voltage application member can apply a DC voltage with the AC voltage being superimposed, and in a case where the controller judges, on the basis of the vibration characteristics of the cantilever, that the electric potential difference exists between the surface of the sample and the probe of the cantilever, it applies also the DC voltage together with the AC voltage by the voltage application member to thereby gradually change the DC voltage, thereby causing the vibration characteristics of the cantilever to be repeatedly detected by the measurement member, and, in a case where a composite wave of plural waveforms whose amplitudes differ is detected in a vibration waveform of the cantilever, it extracts a sum of a magnitude of the DC voltage finally applied by the voltage application member and a magnitude of the amplitude of the AC voltage as the electric potential difference between the surface of the sample and the probe of the cantilever.

According to the electric potential difference detection method and the scanning probe microscope, which are concerned with this invention, in a case where the electric potential difference occurs between the surface of the sample and the probe of the cantilever, and that electric potential difference is smaller than the sum of the magnitude of the DC voltage applied by the voltage application member in the voltage application process and the magnitude of the amplitude of the AC voltage, the electrostatic attraction force shows maximum values of magnitudes respectively different at the time in which the AC voltage is plus and the time in which it is minus. Therefor, the vibration waveform of the cantilever becomes the composite wave of plural waveforms whose amplitudes differ. That is, by repeatedly performing the voltage application process, the detection process and the analysis process, and extracting the sum of the magnitude of the DC voltage in final and the magnitude of the amplitude of the AC voltage in the case where the composite wave is stated to be detected as the vibration waveform, it is possible to quantitatively detect the electric potential difference between the surface of the sample and the probe of the cantilever.

Further, in the above scanning probe microscope, it is deemed to be more desirable that in a case where the controller extracts the sum of the magnitude of the DC voltage and the magnitude of the amplitude of the AC voltage as the electric potential difference between the surface of the sample and the probe of the cantilever, it starts a collection of the observation data under a state in which by the voltage application member there is applied the DC voltage different in plus and minus with its absolute value being made equal to the electric potential difference.

According to the scanning probe microscope of this invention, like the above, in a case where the electric potential difference between the surface of the sample and the probe of the cantilever can be quantitatively detected, by applying the DC voltage different in plus/minus by the voltage application member with its absolute value being made equal to this electric potential difference, there becomes a state in which the electric potential difference between the surface of the sample and the probe of the cantilever is cancelled. Under this state, by starting the collection of the observation data, it is possible to accurately observe the sample without undergoing the influence of the electric potential difference.

Further, in the above electric potential difference detection method, it is deemed to be more desirable that in a case where, in the analysis process, there is judged that the electric potential difference exists between the surface of the sample and the probe of the cantilever, a DC voltage is applied together with the AC voltage in the voltage application process and the DC voltage is gradually changed, thereby repeatedly performing the voltage application process, the detection process and the analysis process, and in a case where, after a composite wave of plural waveforms whose amplitudes differ is detected in a vibration waveform of the cantilever in the detection process, a vibration amplitude of the cantilever, which is detected in the detection process by additionally changing the DC voltage in the voltage application process, shows a maximum value, the analysis process extracts a magnitude of the DC voltage applied in the voltage application process when the maximum value is shown, as the electric potential difference between the surface of the sample and the probe of the cantilever.

Further, in the above scanning probe microscope, it is deemed to be more desirable that the voltage application member can apply a DC voltage with the AC voltage being superimposed and in a case where the controller judges, on the basis of the vibration characteristics of the cantilever, that the electric potential difference exists between the surface of the sample and the probe of the cantilever, it applies also the DC voltage together with the AC voltage by the voltage application member to thereby gradually change the DC voltage, thereby causing the vibration characteristics of the cantilever to be repeatedly detected by the measurement member, and, in a case where, after a composite wave of plural waveforms whose amplitudes differ is detected in a vibration waveform of the cantilever, a vibration amplitude of the cantilever, which is detected by additionally changing the DC voltage by the voltage application member, shows a maximum value, it extracts a magnitude of the DC voltage applied by the voltage application member when the maximum value is shown, as the electric potential difference between the surface of the sample and the probe of the cantilever.

According to the electric potential difference detection method and the scanning probe microscope, which are concerned with this invention, if the DC voltage applied in the voltage application process is changed, there can be made a state in which the electric potential difference occurring between the surface of the sample and the probe of the cantilever, and the DC voltage are cancelled. Under this state, since there becomes a state in which the electric potential difference occurs only by the AC voltage, the cantilever becomes a resonance state, and its amplitude shows the maximum value. That is, by extracting the DC voltage when the maximum value is shown, it is possible to quantitatively detect the electric potential difference between the surface of the sample and the probe of the cantilever.

Further, in the above scanning probe microscope, it is deemed to be more desirable that in a case where the controller extracts the magnitude of the DC voltage as the electric potential difference between the surface of the sample and the probe of the cantilever, it starts the collection of the observation data under a state in which the DC voltage is applied by the voltage application member.

According to the scanning prove microscope concerned with this invention, like the above, in the case where the electric potential difference between the surface of the sample and the probe of the cantilever can be quantitatively detected, by applying the DC voltage on that occasion by the voltage application member, there becomes the state in which the electric potential difference between the surface of the sample and the probe of the cantilever is cancelled. Under this state, by starting the collection of the observation data, it is possible to accurately observe the sample without undergoing the influence of the electric potential difference.

Further, in the above electric potential difference detection method, it is deemed to be more desirable that when starting the voltage application process, a separation distance between the probe of the cantilever and the surface of the sample is set below 1 mm.

Further, in the above scanning probe microscope, it is deemed to be more desirable that in a case where the controller applies the AC voltage by the voltage application member in order to judge an existence/nonexistence of the electric potential difference between the surface of the sample and the probe of the cantilever, it causes a separation distance between the probe of the cantilever and the surface of the sample to be set below 1 mm by the movement member.

According to the scanning probe microscope concerned with this invention, when starting the voltage application process, by the fact that the separation distance between the probe of the cantilever and the surface of the sample is set below 1 mm, it is possible to enlarge the electrostatic attraction force acting by an electric field formed between the probe of the cantilever and the surface of the sample. Therefor, it is possible to enlarge the amplitude of the cantilever vibrating by the application of the AC voltage, and it is possible to precisely detect the electric potential difference.

Further, in the above electric potential detection method, there may be made one in which when starting the voltage application process, after a position of the probe of the cantilever is set to a measurement position capable of measuring the surface of the sample, the probe of the cantilever is separated in regard to the surface of the sample by a previously set distance with the measurement position being made a reference.

Further, in the above scanning probe microscope, there may be made one in which in a case where the controller applies the AC voltage by the voltage application member in order to judge an existence/nonexistence of the electric potential difference between the surface of the sample and the probe of the cantilever, after it sets by the movement member a position of the probe of the cantilever to a measurement position in which a measurement of the surface of the sample is possible, it causes the probe of the cantilever to be separated in regard to the surface of the sample by a previously set distance with the measurement position being made a reference.

According to the scanning probe microscope concerned with this invention, by starting the voltage application process by separating the position of the probe of the cantilever by the previously set distance with the measurement position being made the reference, it is possible to detect the electric potential difference with a good reproducibility.

Further, in the above electric potential difference detection method, it is deemed to be more desirable that in a case where the probe of the cantilever is separated in regard to the surface of the sample, there is performed by using a deformation of a previously provided piezoelectric element as a movement member relatively moving the sample and the cantilever.

Further, in the above scanning probe microscope, it is deemed to be more desirable that the movement member is a piezoelectric element deformable by applying the voltage, and the probe of the cantilever is separated in regard to the surface of the sample by a deformation of the piezoelectric element.

According to the scanning probe microscope concerned with this invention, by the fact that the piezoelectric element is used as the movement member, it is possible to perform the detection of the electric potential difference while precisely adjusting a relative position of the probe of the cantilever, and it is possible to additionally raise the reproducibility.

Further, in the above scanning probe microscope, it is deemed to be more desirable that it comprises a vibration source vibrating by applying the AC voltage and causing the cantilever to vibrate at a predetermined frequency, a vibration electric source capable of applying the AC voltage, and a switch connecting the vibration electric source so as to be capable of switching to a state capable of applying the AC voltage to the vibration source and a state capable of applying the AC voltage between the sample and the cantilever as the voltage application member.

According to the scanning probe microscope concerned with this invention, by applying the AC voltage to the vibration source by the vibration electric source, it is possible to cause the cantilever to vibrate at the resonance frequency, and it is possible to perform the observation of the sample as the so-called DFM. Further, by switching by the switch, it becomes possible to use the vibration electric source as the voltage application member applying the AC voltage between the sample and the cantilever. Therefor, it is unnecessary to separately provide an AC signal generator for detecting electric potential difference between the surface of the sample and the probe of the cantilever, so that it is possible to contrive a reduction in device cost.

Further, in the above scanning probe microscope, there may be made one in which it comprises an electrification removal member removing an electrification of the sample, and in a case where the controller judges that the electric potential difference exists between the surface of the sample and the probe of the cantilever, it causes the electrification removal member to drive.

According to the scanning probe microscope concerned with this invention, in a case where, resulting from the electrification of the sample, the electric potential difference occurs between the surface of the sample and the probe of the cantilever, it is possible to remove the electrification by causing the electrification removal member to drive on the basis of the judgment on the existence/nonexistence of the electric potential difference by the controller. Therefor, it is possible to accurately perform the observation of the sample.

According to the electric potential difference detection method of the present invention, merely applying the AC voltage of the frequency of ½ of the resonance frequency of the cantilever in the voltage application process, and detecting the vibration characteristics of the cantilever in the detection process, so that also as a member necessary for the detection it may be simple one. Further, in the case where the electric potential difference does not exist, the vibration characteristics become remarkable by the fact that the cantilever resonates, so that it is possible to make its judgment clear. Therefor, it is possible to easily and accurately detect the existence/nonexistence of the electric potential difference between the surface of the sample and the probe of the cantilever.

According to the scanning probe microscope of the present invention, merely applying the AC voltage of the frequency of ½ of the resonance frequency of the cantilever by the voltage application member, and detecting the vibration characteristics of the cantilever by the measurement member, so that a constitution necessary for the detection can be made simple one. Further, in the case where the electric potential difference does not exist, the vibration characteristics become remarkable by the fact that the cantilever resonates, so that it is possible to clearly judge by the controller. Therefor, by a simple constitution it is possible to easily and accurately detect the existence/nonexistence of the electric potential difference between the surface of the sample and the probe of the cantilever, and it is possible to accurately perform the observation by performing the observation of the sample on the basis of the detection of the electric potential difference.

DETAILED DESCRIPTION OF THE INVENTION

First Embodiment

Figure 1:
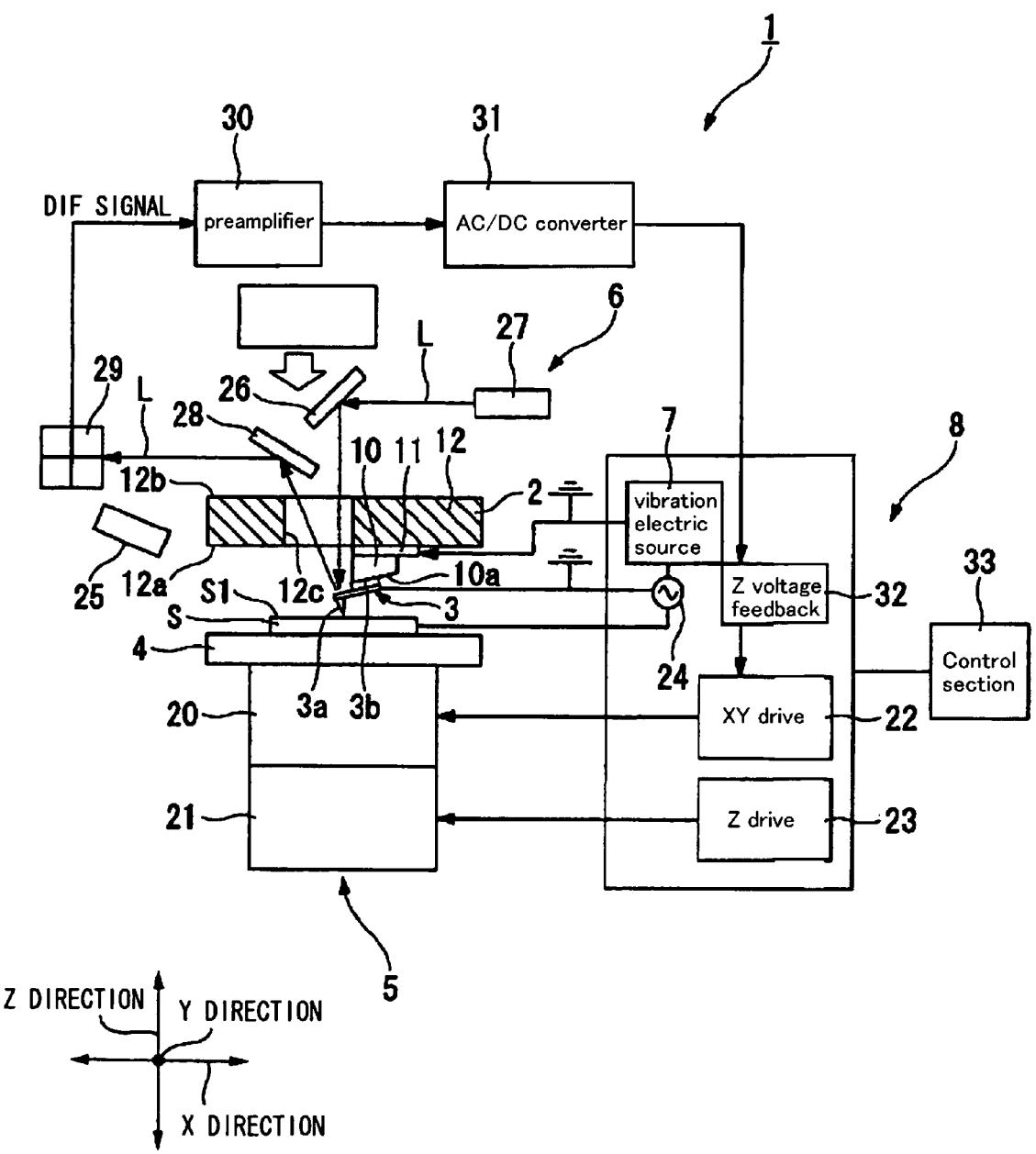
FIG. 1 is a constitutional diagram of a scanning probe microscope in a first embodiment of this invention.
Figure 5:
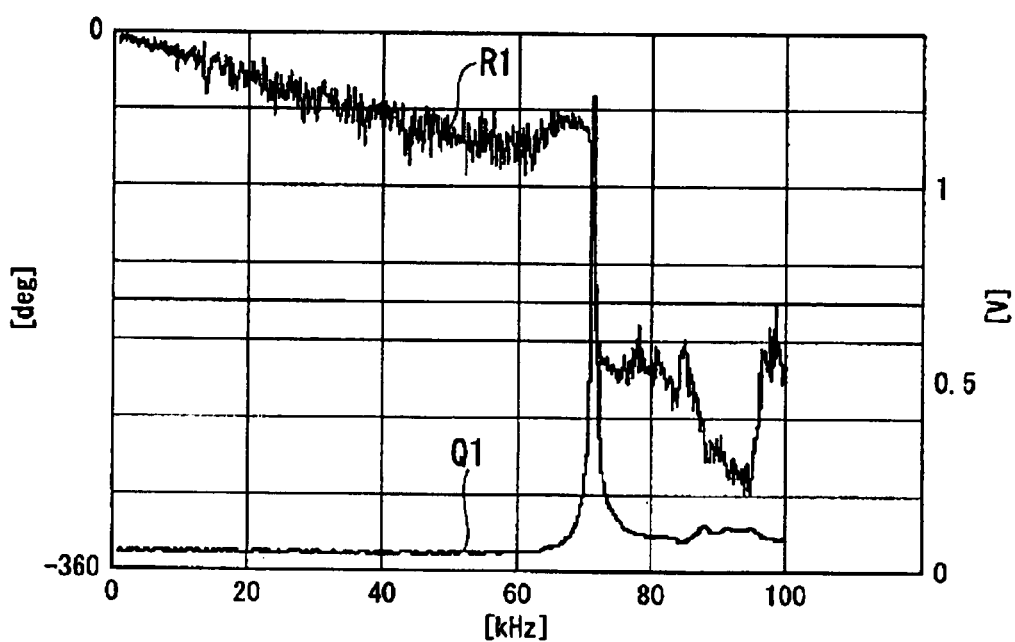
FIG. 5 is a graph showing relations between a vibration frequency and a vibration amplitude of the cantilever, and between an AC voltage and a phase difference in a vibration of the cantilever as first experimental results in the first embodiment of this invention.

FIG. 1 and FIG. 5 show a first embodiment concerned with this invention. FIG. 1 shows a schema view of a scanning probe microscope of the present embodiment. Incidentally, in the present embodiment, there is explained with a sample scan system moving a sample side in a three-dimensional direction being made an example. As shown in FIG. 1, a scanning probe microscope 1 of the present embodiment comprises a cantilever holder 2, a cantilever 3 having in its tip a probe 3a, supported under an overhung state in a main body part 3b of its base end side and fixed to the cantilever holder 2, a sample base 4 mounting a sample S disposed while facing on the probe 3a, a movement member 5 relatively scanning the probe 3a and the sample S in an XY direction parallel to a sample surface S1 and relatively moving them in a Z direction perpendicular to the sample surface S1, a measurement member 6 measuring a displacement of a vibration state of the cantilever 3, and a controller 8 which, as to the probe 3a and the sample surface S1 at a scanning time, controls the movement member 5 on the basis of a measurement result of the measurement member 6 such that the vibration state of the cantilever 3 becomes constant, and collects a measurement data. Incidentally, in the present embodiment, there is explained with a case where the controller 8 controls the movement member 5 such that a vibration amplitude of the cantilever 3 becomes constant being made an example. The cantilever holder 2 comprises a slant face block (mounting base) 10 mounting and fixing the main body part 3b to a mounting face 10a under a state in which the cantilever 3 is slanted by a predetermined angle in regard to the sample S, a vibration source 11 fixed to the slant face block 10, and vibrating at a frequency and an amplitude, which comply with a predetermined waveform signal, and a holder main body 12 to which the vibration source 11 is fixed.

The holder main body 12 is formed like a flat plate having a first face 12a and a second face 12b, which are mutually opposed, and disposed with the first face 12a being directed to the sample S side. Further, in the holder main body 12, there is formed an opening part 12c through which a later-mentioned laser light L is entered in regard to a reflection face, not shown in the drawing, of the fixed cantilever 3, and through which the laser light L reflected by the reflection face is emitted. There is made such that the vibration source 11 is fixed to the first face 12a, and vibrates at predetermined frequency and amplitude on the basis of a waveform signal inputted from a vibration electric source 7 shown in FIG. 1. Further, the slant face block 10 is fixed to a lower face of the vibration source 11 under a state in which the mounting face 10a is directed to the sample S side. And, to this mounting face 10a, the main body part 3b of the cantilever 3 is mounted, and fixed by utilizing a wire not shown in the drawing, and the like.

As shown in FIG. 1, the cantilever holder 2 constituted like this is fixed above the sample S by a trestle not shown in the drawing. Further, the sample base 4 is mounted on an XY scanner 20, and the XY scanner 20 is mounted on a Z scanner 21. Further, this Z scanner 21 is mounted on a vibration proofing base not shown in the drawing. The XY scanner 20 and the Z scanner 21 are piezoelectric elements for instance, and made so as to minutely move in the respective directions with voltages being applied respectively from an XY drive section 22 and a Z drive section 23. That is, the XY scanner 20, the Z scanner 21, the XY drive section 22 and the Z drive section 23 constitute the above movement member 5.

Further, between the cantilever 2 and the sample S mounted to the sample base 4, there is connected an AC signal generator 24 that is a voltage application member capable of applying an AC voltage at a predetermined amplitude. The AC signal generator 24 is grounded in the cantilever 3 side, and can periodically apply the AC voltage to the sample S. Above the sample S mounted to the sample base 4, an electrostatic blower 25 is provided in a position not interfering with the cantilever 3. The electrostatic blower 25 can blow an air ionized to either of plus and minus to the sample surface S1 mounted to the sample base 4 and, by this, it is possible to electrically neutralize the sample surface S1.

Further, above the cantilever holder 2, there are provided a light irradiation section 27 irradiating the laser light L toward a reflection face, which is not shown in the drawing and formed in a back face of the cantilever 3, by utilizing a mirror 26, and a light detection section 29 receiving the laser light L reflected by the reflection face by utilizing a mirror 28. Incidentally, there is made such that the laser light L irradiated from the light irradiation section 27 reaches the reflection face while passing through the opening part 12c of the holder main body 12 and, after being reflected by the reflection face, passes through the opening part 12c again and enters the light detection section 29.

Further, the light detection section 29 is a photodetector for instance, and detects a vibration state (amplitude) of the cantilever 3 from an incident position of the laser light L. And, the light detection section 29 outputs a displacement of the detected vibration state of the cantilever 3 to a preamplifier 30 as a DIF signal. That is, the light irradiation section 27, the mirrors 26, 28 and the light detection section 29 constitute the above measurement member 6.

Further, the DIF signal outputted from the light detection section 29 is amplified by the preamplifier 30, thereafter sent to an AC-DC conversion circuit 31 to thereby be DC-converted, and sent to a Z voltage feedback circuit 32. The Z voltage feedback circuit 32 feedback-controls the Z drive section 23 such that the DIF signal DC-converted becomes always constant. By this, it is possible to control, when the scanning is performed by the movement member 5, a distance between the probe 3a and the sample surface S1 such that the vibration state of the cantilever 3 becomes constant, i.e., such that the amplitude becomes constant.

Further, there is made such that a control section 33 is connected to the Z voltage feedback circuit 32, and the control section 33 can perform a measurement of a surface shape of the sample S, which bases on the DIF signal DC-converted, a measurement of various physical properties information (e.g., a magnetic force, an electric potential or the like), which bases on a change in the phase, and the like, and can collect an observation data of the sample surface. That is, the Z voltage feedback circuit 32 and the control section 33 constitute the above control member 8. Incidentally, this controller 8 has a function synthetically controlling each of the above constituent elements. Further, the control section 33 of the controller 8 generates the AC voltage of a predetermined amplitude by the AC signal generator 24, can detect, on the basis of a detection result by the measurement member 6 on that occasion, an electric potential difference between the sample surface S1 and the probe 3a of the cantilever 3, and additionally can drive, on the basis of its result, the electrostatic blower 25. Hereunder, there are explained about details of procedures of the electric potential difference detection by the controller 8, and observation procedures of the sample on the basis of the detection result.

First, the desired sample S is disposed to the sample base 4, and connected to the AC signal generator 24. And, the Z drive section 23 of the movement member 5 is driven and, with the distance between the sample surface S1 and the probe 3a of the cantilever 3 when performing the observation of the sample S being made a reference, it is made a state separated below by about 100 nm than the reference. Next, a Q curve measurement is performed. That is, a measurement of a resonance frequency of the cantilever 3 is performed by changing a vibration frequency by the vibration source 11. The control section 33 determines a frequency of a later-mentioned AC voltage on the bases of this measured resonance frequency. And, if the measurement of the resonance frequency is completed, the vibration of the cantilever 3 by the vibration source 11 is stopped, and there is waited till the vibration calms down.

Next, as a voltage application process, the control section 33 applies the AC voltage by the AC signal generator 24. The AC voltage to be applied is applied with a frequency smaller than the resonance frequency confirmed by the above, and it is swept till the resonance frequency by gradually enlarging the frequency. By the fact that this AC voltage is applied, an electric field is formed between the sample surface S1 and the probe 3a of the cantilever 3, and by this it follows that an electrostatic attraction force acts on the cantilever 3. This electrostatic attraction force is proportional to a magnitude of absolute value of the AC voltage to be applied, i.e., it follows that it periodically acts, and by this the cantilever 3 vibrates. Next, as a detection process, there is detected vibration characteristics of the cantilever 3 at a frequency in which the frequency of the AC voltage becomes ½ of the resonance frequency. That is, in the light detection section 29 of the measurement member 6, the amplitude is detected as the vibration characteristics by obtaining a vibration waveform of the cantilever 3 from an incident position, of the laser light L, changing by the fact that the cantilever 3 vibrates. Next, as an analysis process, the control section 33 performs a judgment on whether or not an electric potential difference occurs between the sample surface S1 and the probe 3a of the cantilever 3 by comparing a magnitude of the detected amplitude with a previously set reference value L.

Hereunder, there are explained about typical three patterns of a vibration state, of the cantilever 3, detected by the measurement member 6 in a case where, in the voltage application process, the AC voltage is applied under conditions of the frequency of ½ of the resonance frequency and a predetermined amplitude V1.

<First Pattern>

Figure 2:
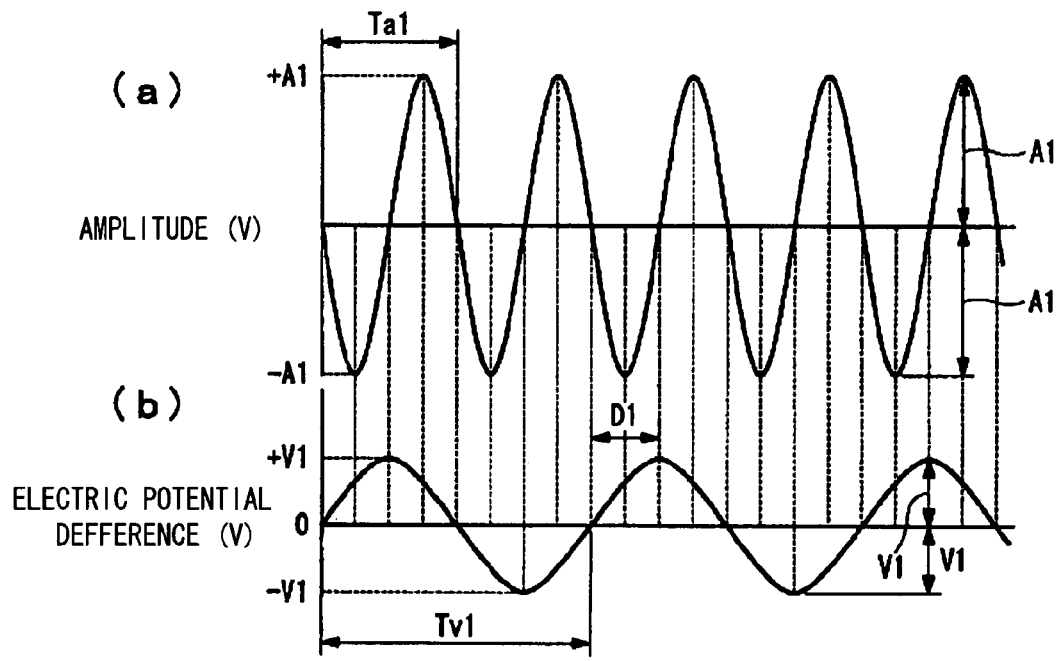
FIG. 2 is a graph showing a vibration waveform of a cantilever as a first pattern in the first embodiment of this invention, and a graph showing a waveform of an electric potential difference between a sample surface and a probe of the cantilever as the same.

In a case where the electric potential difference does not occur between the cantilever 3 and the sample S, FIG. 2 shows a vibration waveform, of the cantilever 3, obtained by the measurement member 6, and a waveform of the electric potential difference occurring between the sample surface S1 and the probe 3a of the cantilever 3 by applying, on that occasion, the AC voltage by the voltage signal generator 24.

As shown in (b) of FIG. 2, by the fact that the AC voltage is applied at a previously set frequency and the amplitude V1, the electric potential difference between the sample surface S1 and the probe 3a of the cantilever 3 periodically occurs in a range of +V1 to −V1 and at a period Tv1 corresponding to the frequency of ½ of the resonance frequency of the cantilever 3. Further, since the electrostatic attraction force acting on the cantilever 3 is proportional to the absolute value of the electric potential difference between the sample surface S1 and the probe 3a of the cantilever 3, it follows that it periodically acts at a period Ta1 of ½ of the period Tv1 of the electric potential difference, i.e., at the resonance frequency of the cantilever 3. Therefor, as shown in (a) of FIG. 2, since the cantilever 3 becomes a resonance state by the acting electrostatic attraction force, it follows that, at the resonance frequency, it vibrates with an amplitude A1 being made large one with a phase difference D1 between the electrostatic attraction force and the electric potential difference between the sample surface S1 and the probe 3a of the cantilever 3 being made about 90 degrees.

<Second Pattern>

Figure 3:
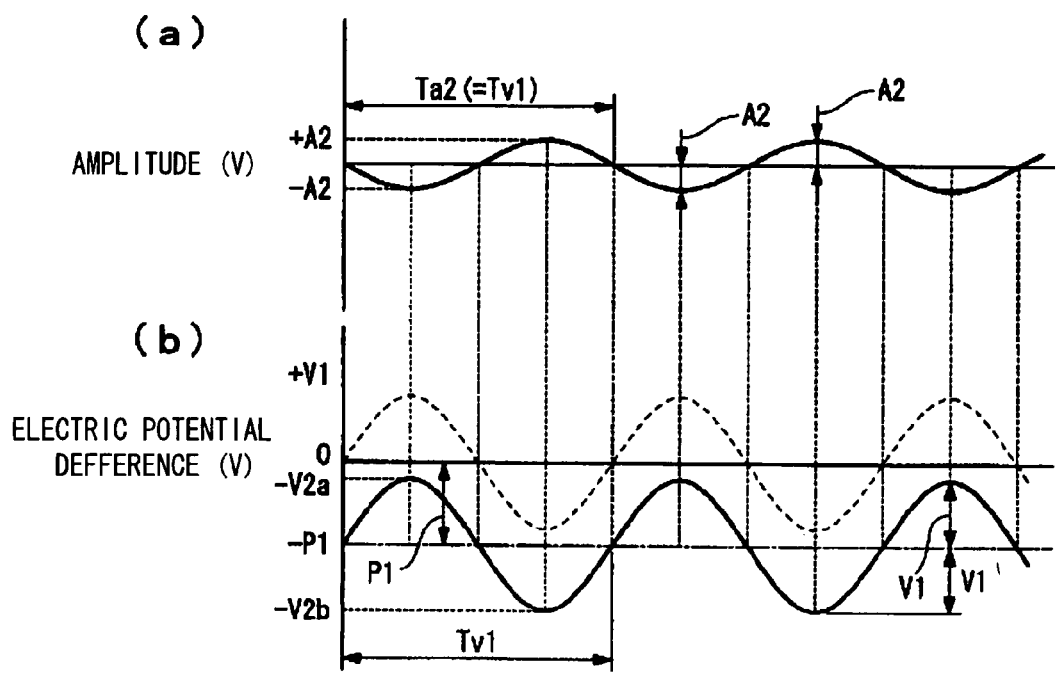
FIG. 3 is a graph showing the vibration waveform of the cantilever as a second pattern in the first embodiment of this invention, and a graph showing the waveform of the electric potential difference between the sample surface and the probe of the cantilever as the same.

In a case where an electric potential difference P1 occurs between the cantilever 3 and the sample S under an initial state, FIG. 3 shows the vibration waveform, of the cantilever 3, obtained by the measurement member 6, and the waveform of the electric potential difference occurring between the sample surface S1 and the probe 3a of the cantilever 3 by applying, on that occasion, the AC voltage by the voltage signal generator 24. Incidentally, FIG. 3 shows about a case where rather the amplitude V1 is smaller than the electric potential difference P1.

As shown in (b) of FIG. 3, between the cantilever 3 and the sample S, the AC voltage is applied at the frequency and the amplitude V1, which are similar to the above, under a state in which the electric potential difference P1 occurs. Therefor, the electric potential difference between the sample surface S1 and the probe 3a of the cantilever 3 periodically occurs in a range of −V2a (=−P1+V1) to −V2b (=−P1−V1) and at the period Tv1 corresponding to the frequency of ½ of the resonance frequency of the cantilever 3. In the present pattern, since rather the amplitude V1 is smaller than the electric potential difference P1, there becomes a state in which the minus electric potential difference always, periodically occurs. That is, it follows that the electrostatic attraction force, which periodically acts by the electric potential difference occurring between the sample surface S1 and the probe 3a of the cantilever 3, shows a greatest value only at a time of the electric potential difference −V2b, and thus it follows that it acts at a frequency Ta2 (=Tv1) equal to the period Tv1 of the AC voltage to be applied, i.e., at the frequency of ½ of the resonance frequency of the cantilever 3. Therefor, as shown in (a) of FIG. 3, it follows that the cantilever 3 does not become the resonance state, and vibrates at the frequency of ½ of the resonance frequency by the electric potential difference and the electrostatic attraction force, which are between the sample surface S1 and the probe 3a of the cantilever 3, and in a phase difference of 180 degrees or the same phase. And, since it is not under the resonance state, an amplitude A2 of the cantilever 3 becomes extremely smaller than the amplitude A1 shown in (a) of FIG. 2 under the resonance state.

<Third Pattern>

Figure 4:
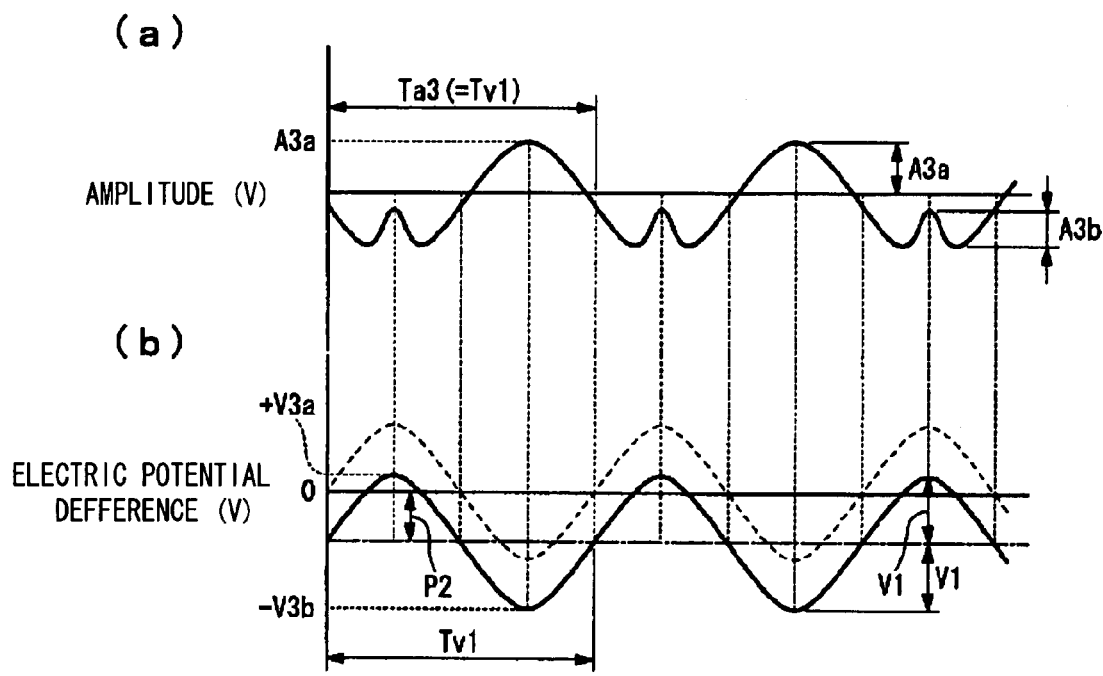
FIG. 4 is a graph showing the vibration waveform of the cantilever as a third pattern in the first embodiment of this invention, and a graph showing the waveform of the electric potential difference between the sample surface and the probe of the cantilever as the same.

In a case where an electric potential difference P2 occurs between the cantilever 3 and the sample S under the initial state, FIG. 4 shows the vibration waveform, of the cantilever 3, obtained by the measurement member 6, and the waveform of the electric potential difference occurring between the sample surface S1 and the probe 3a of the cantilever 3 by applying, on that occasion, the AC voltage by the voltage signal generator 24. Incidentally, FIG. 4 shows about a case where rather the amplitude V1 is larger than the electric potential difference P2.

As shown in (b) of FIG. 4, between the cantilever 3 and the sample S, the AC voltage is applied at the frequency and the amplitude V1, which are similar to the above, under a state in which the electric potential difference P2 occurs. Therefor, the electric potential difference between the sample surface S1 and the probe 3a of the cantilever 3 periodically occurs in a range of +V3a (=−P1+V1) to −V3b (=−P1−V1) and at the period Tv1 corresponding to the frequency of ½ of the resonance frequency of the cantilever 3. In the present pattern, since rather the amplitude V1 is larger than the electric potential difference P2, although plus and minus electric potential differences periodically occur, there becomes a state in which it periodically occurs in a range biasing to either of plus and minus. That is, it follows that the electrostatic attraction force, which periodically acts by the electric potential difference occurring between the sample surface S1 and the probe 3a of the cantilever 3, shows a maximum value at a time of the electric potential differences +V3a and −V3b, where as shows the greatest value only at a time of −V3b. Therefor, it follows that while it acts at the frequency Ta2 (=Tv1) equal to the period Tv1 of the AC voltage to be applied, i.e., at the frequency of ½ of the resonance frequency of the cantilever 3, it shows, in one period, the maximum value in positions corresponding to the electric potential differences +V3a and −V3b. Therefor, as shown in (a) of FIG. 4, it follows that the cantilever 3 vibrates by the electric potential difference and the electrostatic attraction force, which are between the sample surface S1 and the probe 3a of the cantilever 3, and in the phase difference of 180 degrees or the same phase, and amplitudes A3a and A3b and a composite wave of two different waveforms are detected in the vibration waveform. It follows that the composite wave like this vibrates as a whole by the two waveforms at a frequency of two times of the frequency of the AC voltage, i.e., at the resonance frequency. Therefor, there undergoes an amplification corresponding to a Q value of the cantilever 3 and, since while the amplitude A3a of the cantilever 3 is detected as an amplitude which is large in comparison with the second pattern shown in FIG. 3, it does not become a complete resonance state, it becomes extremely smaller than the amplitude A1 in the resonance state shown in FIG. 2.

That is, as the analysis process, the control section 33 performs a comparison between the reference value L corresponding to the amplitude A1 of the first pattern when the amplitude V1 is applied and thus the cantilever resonates and the amplitude, of the cantilever 3, detected by the measurement member 6. And, in a case where the amplitude of the cantilever 3 exceeds the reference value L, it is possible to judge that the cantilever 3 is under the resonance state, i.e., the electric potential difference does not exist between the sample surface S1 and the probe 3a of the cantilever 3. And, in the case where it is judged that the electric potential difference does not exist, the control section 33 causes the AC signal generator 24 to stop, and causes the vibration source 11 to vibrate by the vibration electric source 7, thereby starting the observation of the sample S by returning the distance between the sample surface S1 and the probe 3a to a distance becoming the observation state.

On the other hand, in a case where the amplitude of the cantilever 3 is smaller than the reference value L, there is judged that the cantilever 3 is not under the resonance state, i.e., the electric potential difference exists between the sample surface S1 and the probe 3a of the cantilever 3. And, in the case like this, there becomes such that the control section 33 can perform the observation of the sample S without undergoing the influence of the electric potential difference by performing a removal of the sample surface S1 by driving the electrostatic blower 25.

Figure 6:
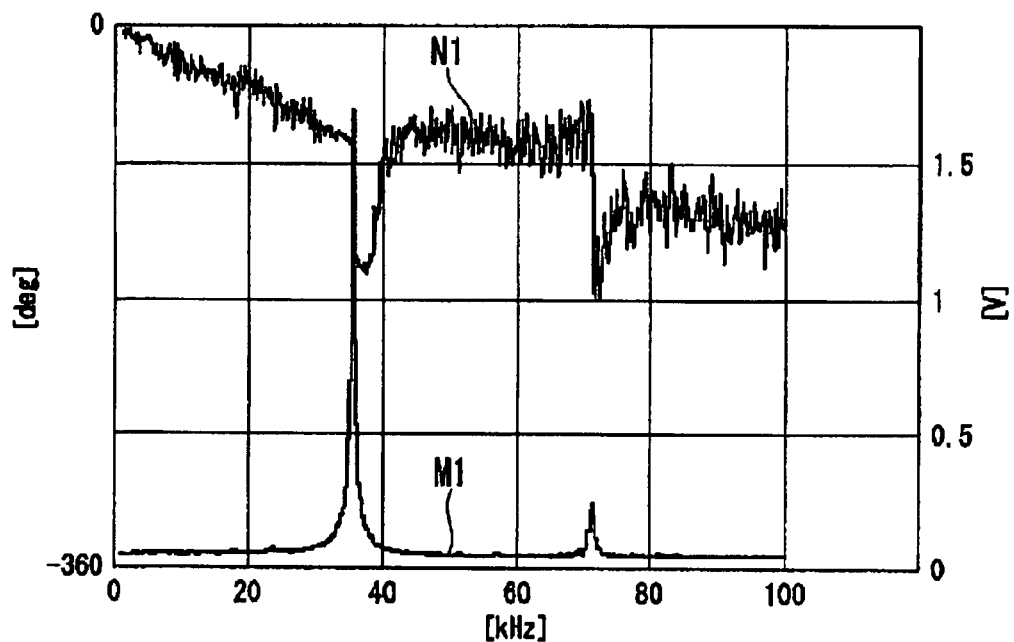
FIG. 6 is a graph showing relations between a frequency of an AC electric current and the vibration amplitude of the cantilever, and between an AC voltage and the phase difference in the vibration of the cantilever as the first experimental results in the first embodiment of this invention.

FIG. 5 and FIG. 6 show actual measurement results. FIG. 5 shows, in a case where the cantilever 3 is vibrated by the vibration source 11 with the frequency being changed, a relation Q1 between the vibration frequency and the vibration amplitude of the cantilever 3, and a relation R1 between the vibration frequency and a phase difference between the AC voltage and the vibration of the cantilever 3. Further, FIG. 6 shows, in a case where the AC voltage is applied between the sample S and the cantilever 3 by the AC signal generator 24, a relation Ml between the frequency of the AC voltage and the vibration amplitude of the cantilever 3, and a relation N1 between the frequency of the AC voltage and the phase difference between the AC voltage and the vibration of the cantilever 3. Incidentally, these experiments are performed after there is made such that an electrification of the sample S is previously removed, and the electric potential difference does not occur between the sample S and the cantilever 3.

As shown in FIG. 5, even if the vibration frequency by the vibration source 11 is gradually enlarged, the amplitude changes in less than 0.1 V, and further also the phase difference does not show a large change although it gradually decreases. On the other hand, there can be confirmed the fact that, if the vibration frequency is enlarged to a position in which it becomes 71.733 kHz, the amplitude becomes extremely large as 1 V or larger and also the phase difference extremely changes. By this, there can be detected the fact that the resonance frequency of this cantilever 3 is 71.733 kHz. On the other hand, as shown in FIG. 6, in a case where the cantilever 3 was vibrated by supplying the AC voltage, such large changes in the amplitude and the phase difference as shown in FIG. 5 could be confirmed by the frequency of about 35 kHz of ½ of the resonance frequency. This results from the fact that, as mentioned above, the electrostatic attraction force periodically acts at the same frequency as the resonance frequency in the case where the AC voltage is applied at the frequency of ½ of the resonance frequency under the state in which the electric potential difference does not occur between the sample surface S1 and the probe 3a of the cantilever 3.

Figure 7:
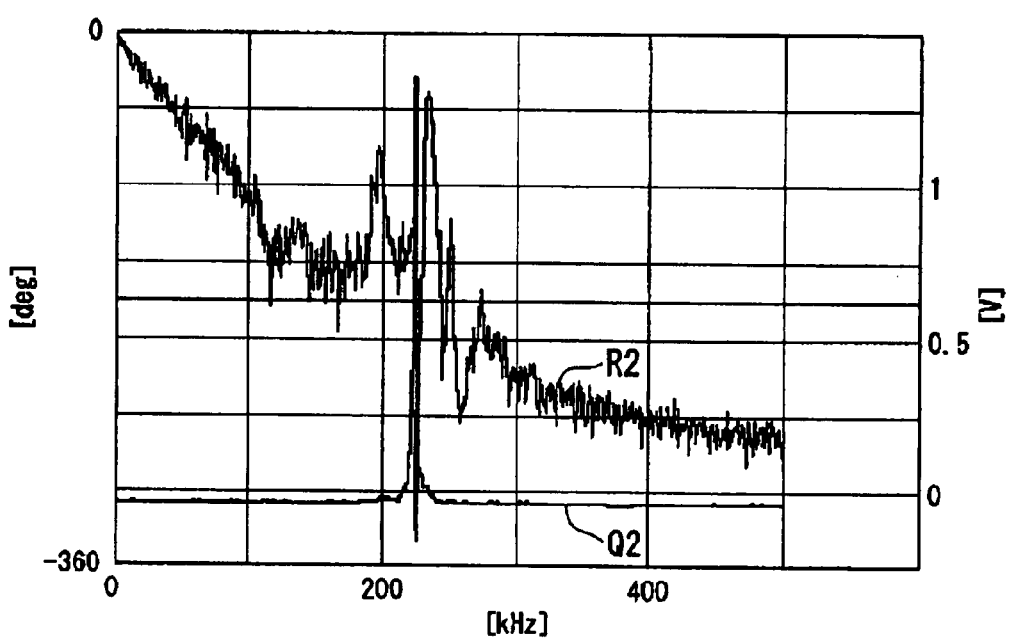
FIG. 7 is a graph showing relations between the vibration frequency and the vibration amplitude of the cantilever, and between the AC voltage and the phase difference in the vibration of the cantilever as second experimental results in the first embodiment of this invention.
Figure 8:
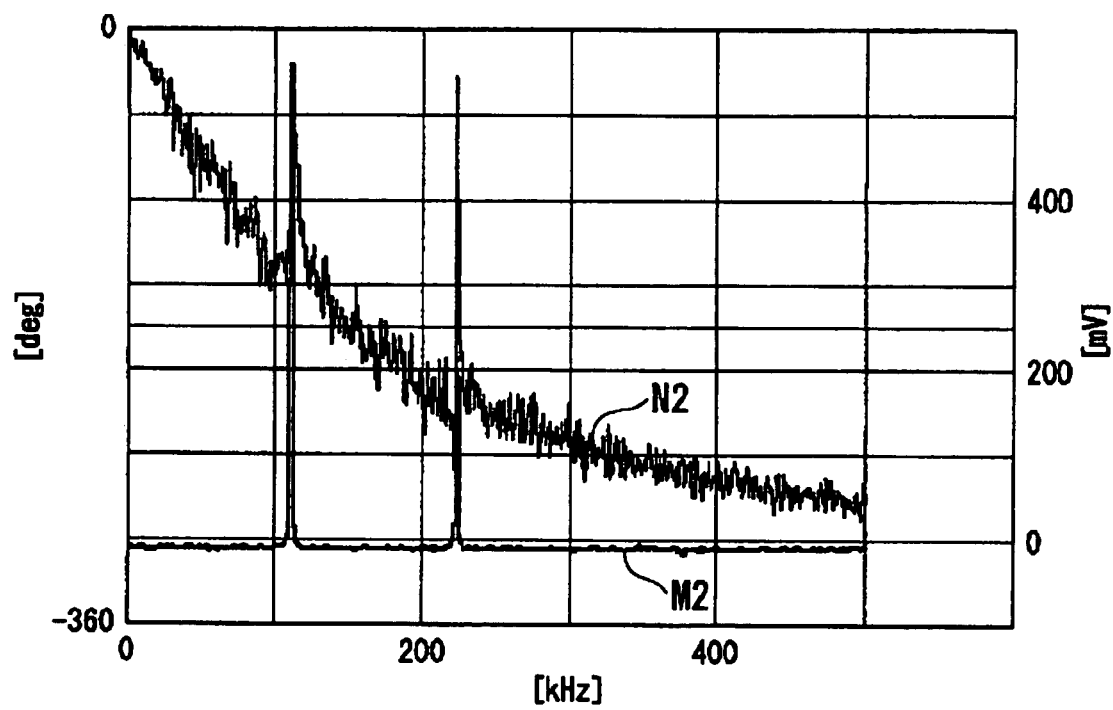
FIG. 8 is a graph showing relations between the frequency of the AC electric current and the vibration amplitude of the cantilever, and between the AC voltage and the phase difference in the vibration of the cantilever as second experimental results in the first embodiment of this invention.

FIG. 7 and FIG. 8 are results when the similar experiment was performed about the cantilever 3 having the resonance frequency different from the above. As shown in FIG. 7, from a relation Q2 between the vibration frequency and the vibration amplitude of the cantilever 3, and a relation R2 between the vibration frequency and the phase difference between the AC voltage and the vibration of the cantilever 3, there can be detected the fact that the resonance frequency of this cantilever 3 is 222.670 kHz. On the other hand, as shown in FIG. 8, from a relation M2 between the frequency of the AC voltage and the vibration amplitude of the cantilever 3, and a relation N2 between the frequency of the AC voltage and the phase difference between the AC voltage and the vibration of the cantilever 3, there could be confirmed the fact that, similarly to the above, the large changes in the amplitude and the phase difference generated at the frequency of about 110 kHz of ½ of the resonance frequency of the AC voltage.

Like the above, in the scanning probe microscope 1 of the present embodiment, in order to judge the existence/nonexistence of the electric potential difference between the sample surface S1 and the probe 3a of the cantilever 3, merely, the AC voltage is applied as the voltage application process, the vibration amplitude of the cantilever 3 is detected as the detection process, and the reference value L and the magnitude of the amplitude are compared as the analysis process.

Therefor, it is possible to easily judge the existence/nonexistence of the electric potential difference between the sample surface S1 and the probe 3a of the cantilever 3 and, in a case where the electric potential difference does not exist, there can be clearly discriminated by the fact that there becomes the resonance state, so that it is possible to perform an accurate judgment. Further, by the fact that the electric potential difference detection like this is performed prior to an observation of the sample S, it is possible to accurately perform a collection of the observation data of the sample after it. Further, as a constitution necessary in the voltage application process, since the AC voltage is merely applied at the predetermined amplitude, it is possible to use a well-known AC signal generator and, further as a constitution necessary for the detection of the amplitude in the detection process, there is merely used the existing measurement member 6 used in an observation data collection of the sample surface S1. Therefor, as a simple constitution, it is possible to suppress an increase in device cost.

Figure 9A:
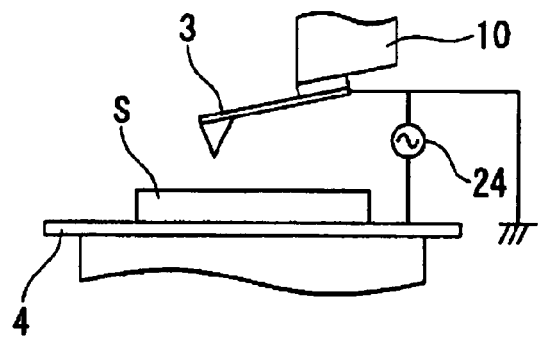
FIGS. 9A, 9B and 9C are schematic views showing modified examples of a connection method of a voltage application member in the first embodiment of this invention.
Figure 9B:
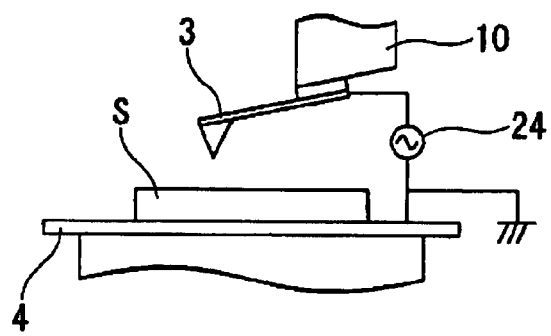
Figure 9C:
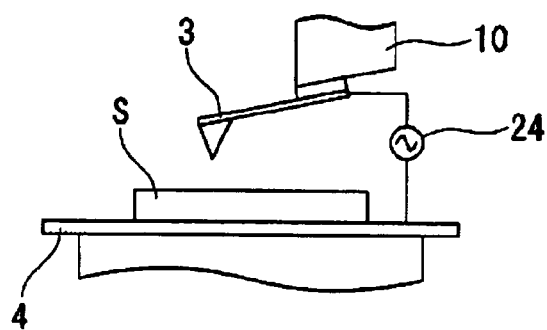

Incidentally, in the present embodiment, although the AC signal generator 24 is made one connected to the cantilever 3 and the sample S, it is not one limited to this. For example, as shown in FIG. 9A, if the sample S is one whose electrical conductivity is good and which is flaky, it may be made one connected to the sample base 4 and the cantilever 3. Further, although it is made one grounded in the cantilever 3 side, it is not one limited to this, and there may be made a constitution in which it is grounded in the sample S side as shown in FIG. 9B. Additionally, as shown in FIG. 9C, there may be made a constitution in which no ground is performed, and the electric potential exists in both sides of the cantilever 3 and sample S sides. Further, although it is necessary that the cantilever 3 is formed such that the AC voltage can be applied, it is unnecessary to perform an electrically conductive metal coating to the surface like the Kelvin probe force microscope and the scanning Maxwell stress microscope. For example, it may be one made of silicon or, even if it is formed by an insulating material made of silicon nitride or the like, if it has in its one part an electrical conductivity like the metal coating reflecting the laser light L of the measurement member 6, it is possible to similarly detect the electric potential difference.

Figure 10:
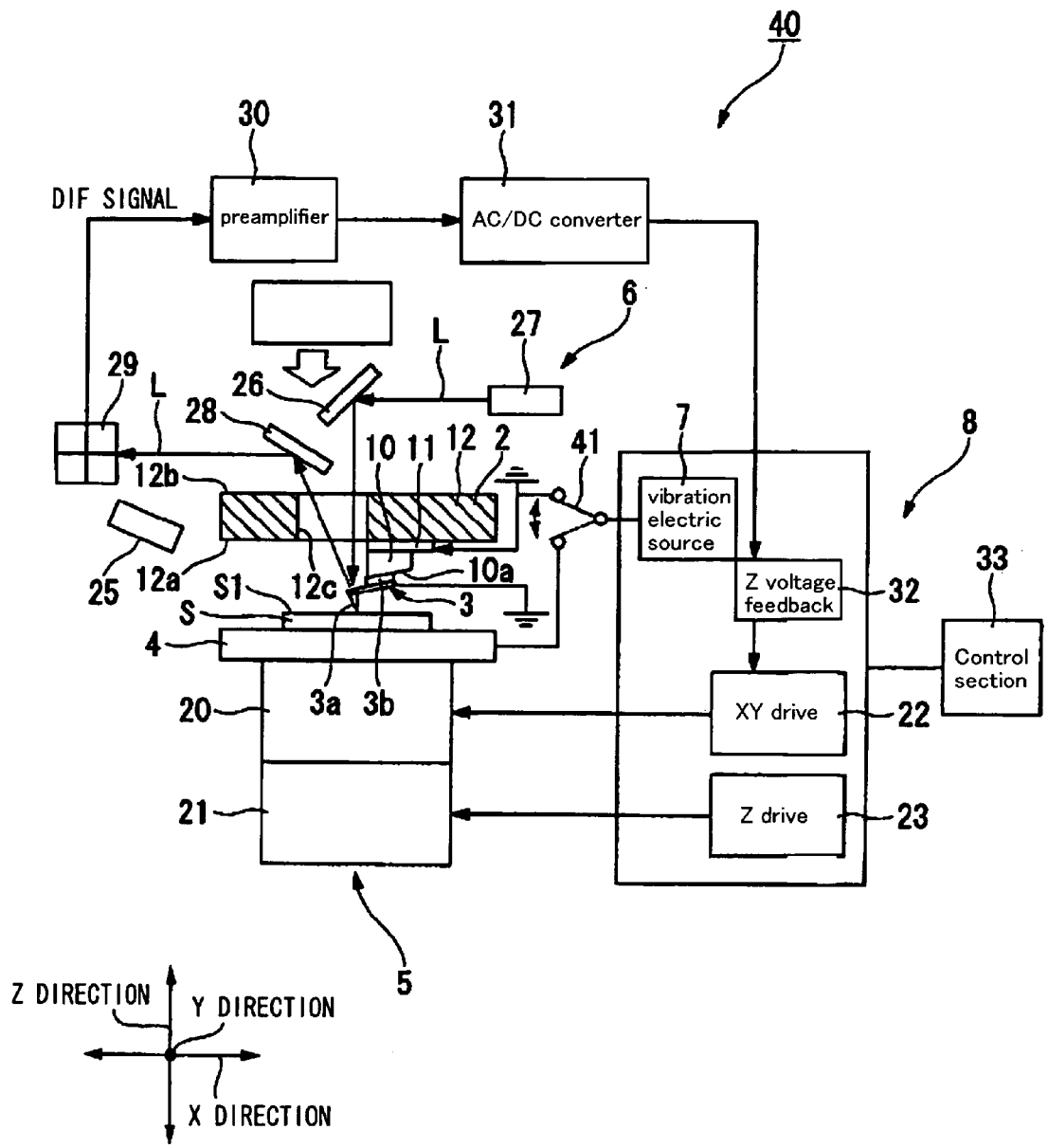
FIG. 10 is a constitutional diagram of a modified example of the scanning probe microscope in the first embodiment of this invention.

Further, as the voltage application member applying the AC voltage between the sample S and the cantilever 3, although there is made one in which the AC signal generator 24 is provided, it is not limited to this. FIG. 10 is one showing a modified example relating to the voltage application member. As shown in FIG. 10, in a scanning probe microscope 40 of the present modified example, a switch 41 is provided between the vibration source 11 and the vibration electric source 7. While the switch 41 can connect the vibration electric source 7 to the vibration source 11 to thereby apply the AC voltage, it can switch to a state connected to the sample base 4. Therefor, by switching by the switch 41, it is possible to apply the AC voltage between the sample S and the cantilever 3 at the predetermined amplitude and frequency by using the vibration electric source 11 as the voltage application member. In this case, by the fact that an existing constitution can be used, it is possible to additionally contrive a reduction in device cost. Further, although the scanning probe microscope 1 of the present embodiment is explained as one capable of measuring in the DFM, it is not one limited to this. For example, even if it is one measuring in the AFM or the like, it is possible to similarly detect the electric potential difference by comprising the voltage application member and the measurement member 6 capable of measuring the vibration state of the cantilever 3.

Further, in the detection process, as the vibration characteristics of the cantilever 3, although the magnitude of the amplitude is detected and the judgment on the existence/nonexistence of the electric potential difference is performed on the basis of the magnitude of the amplitude in the analysis process, it is not one limited to this. For example, in the detection process, as the vibration characteristics of the cantilever 3, there may be made one detecting the frequency. And, in the analysis process, there suffices if there is judged whether or not the detected frequency is approximately equal to the resonance frequency of the cantilever 3. That is, in a case where the electric potential difference does not exist between the sample surface S1 and the probe 3a of the cantilever 3, since the cantilever 3 becomes the resonance state, there can be clearly judged on the basis of the fact that the detected frequency is approximately equal to the resonance frequency of the cantilever 3. On the other hand, in a case where the electric potential difference exists between the sample surface S1 and the probe 3a of the cantilever 3, since it follows that the cantilever 3 vibrates at the same frequency as the AC voltage, there can be clearly judged on the basis of this fact. Also in this case, it is possible to measure by the existing measurement member 6, and it is possible to easily and accurately detect the electric potential difference by the simple constitution.

Figure 11:
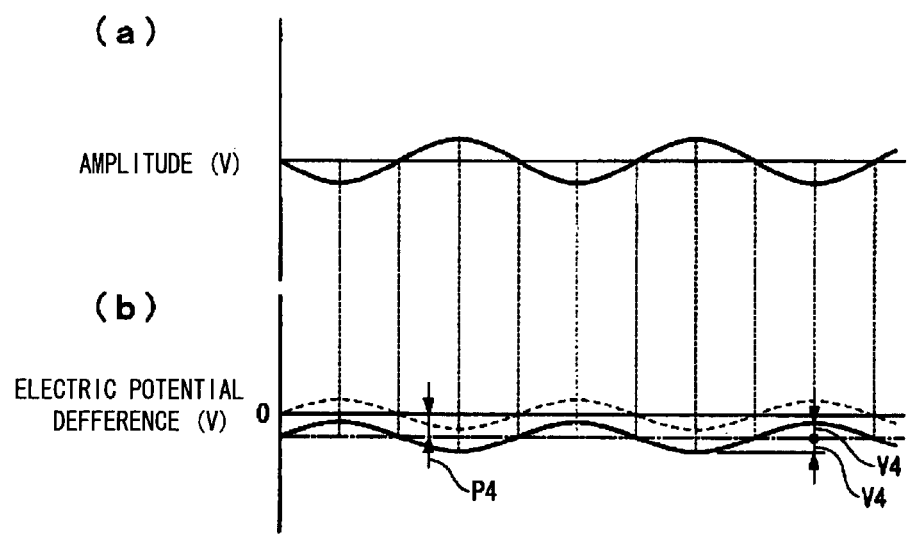
FIG. 11 is a graph showing the vibration waveform of the cantilever in a first modified example of an electric potential difference detection method in a first embodiment of this invention, and a graph showing the waveform of the electric potential difference between the sample surface and the probe of the cantilever in the same.

Further, in the voltage application process, although the AC voltage to be applied is made constant at the V1, it is not one limited to this, and may be made one to be changed. FIG. 11 shows, in a first modified example of the electric potential difference detection method detecting the electric potential difference occurring between the sample surface S1 and the probe 3a of the cantilever 3, an example in which the AC voltage is changed in a case where such a composite wave as shown in (a) of FIG. 4 is detected in the detection process as the vibration waveform of the cantilever 3. Incidentally, as mentioned above, in a case where the composite wave generates as the third pattern as shown in (a) of FIG. 4, its amplitude A3a is extremely smaller than the amplitude A1 in the resonance state of the first pattern, and becomes a value larger than the amplitude A2 in the resonance state of the second pattern. Therefor, even if it is a constitution in which the waveform itself and the frequency cannot be detected by a general scanning probe microscope, from the fact that a constitution detecting the amplitude is equipped in standard, it is possible to detect the composite wave by the magnitude of the amplitude. And, in a case where the composite wave is detected as the vibration waveform of the cantilever 3, the control section 33 gradually decreases the amplitude of the AC voltage, and repeatedly performs the voltage application process, the detection process and the analysis process. In this manner, as to the amplitude of the AC voltage in the initial detection process, even if the composite wave is detected larger than an electric potential difference P4 between the sample surface S1 and the probe 3a of the cantilever 3, by making the amplitude after it as small as V4, the vibration of the cantilever 3 can be made a simple harmonic oscillation as shown in FIG. 11, so that it becomes possible to perform a more clear judgment. Especially, as to a case where the frequency is detected as the vibration characteristics, it is an effective method.

Figure 12:
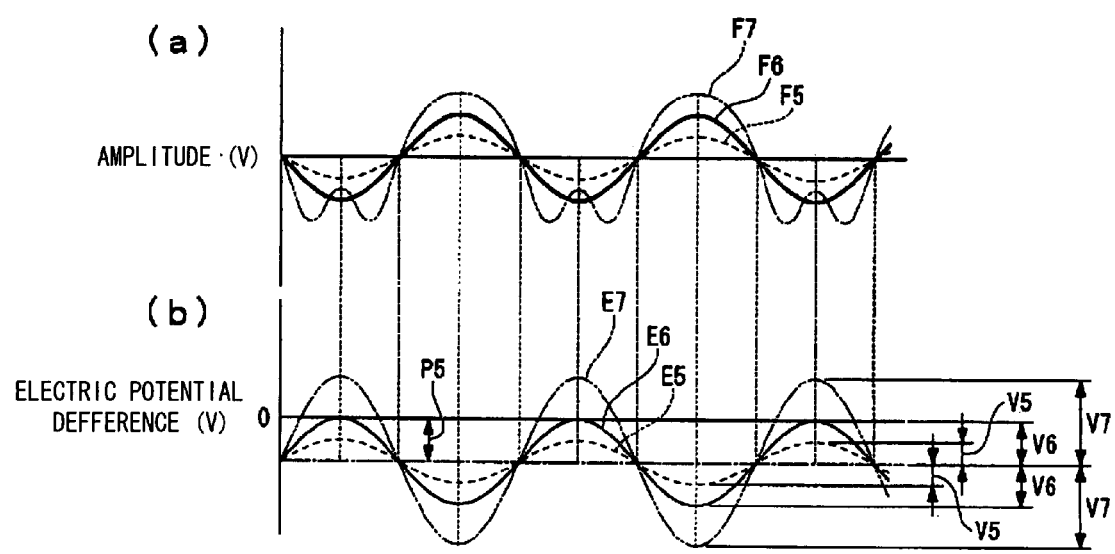
FIG. 12 is a graph showing the vibration waveform of the cantilever in a second modified example of the electric potential difference detection method in the first embodiment of this invention, and a graph showing the waveform of the electric potential difference between the sample surface and the probe of the cantilever in the same.

FIG. 12 shows a second modified example of the electric potential difference detection method detecting the electric potential difference occurring between the sample surface S1 and the probe 3a of the cantilever 3. As shown in FIG. 12, it is supposed that an AC voltage E5 of an amplitude V5 is applied in the initial voltage application process, and there is judged in the analysis process that, from the vibration characteristics detected from a vibration waveform F5 of the cantilever 3, the electric potential difference exists. In this case, the control section 33 gradually increases the amplitude of the AC voltage from the amplitude V5 to thereby repeatedly perform the voltage application process, the detection process and the analysis process and, in a case where, in the analysis process, the composite wave of plural waveforms whose amplitudes differ is detected in the vibration waveform of the cantilever 3, the control section 33 causes the detection of the electric potential difference to stop. As shown in FIG. 12, as to the AC voltage to be applied, it follows that, by enlarging the amplitude as large as V6 and V7, a composite wave F7 is detected at an AC voltage E7 of the amplitude V7 larger in the amplitude than an AC voltage E6 of the amplitude V6. That is, in the analysis process, in a case where the control section 33 detects the composite wave, in other words, in a case where there is made larger than the amplitude V6 in (b) of FIG. 12, the detection of the electric potential difference is finished and, by extracting in a final electric potential difference detection process the amplitude V6 of the applied AC voltage E6, the amplitude V6 and an electric potential difference P5 between the sample surface S1 and the probe 3a of the cantilever 3 become approximately equal, so that it is possible to quantitatively detect the electric potential difference P5.

Figure 13:
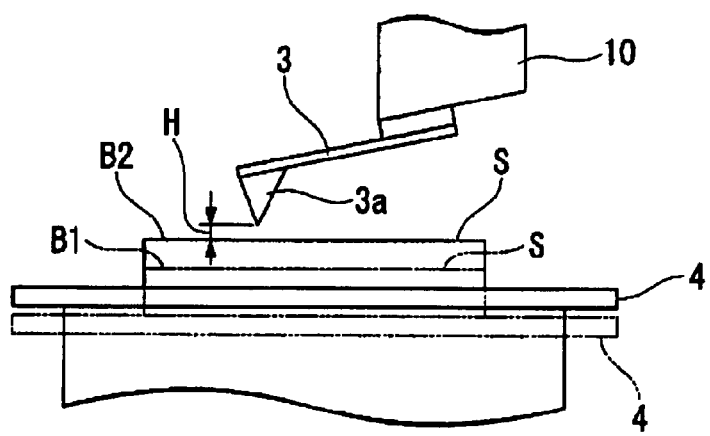
FIG. 13 is a side view showing a positional relation between a sample and the cantilever in a third modified example of the electric potential difference detection method in the first embodiment of this invention.
Figure 14:
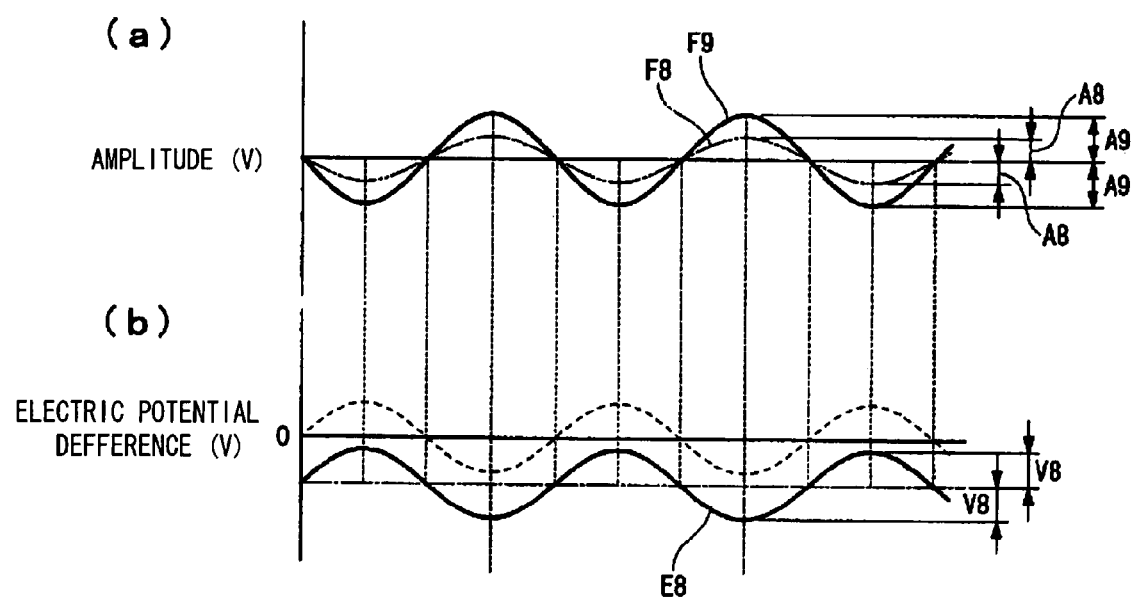
FIG. 14 is a graph showing the vibration waveform of the cantilever in a third modified example of the electric potential difference detection method in the first embodiment of this invention, and a graph showing the waveform of the electric potential difference between the sample surface and the probe of the cantilever in the same.
Figure 15:
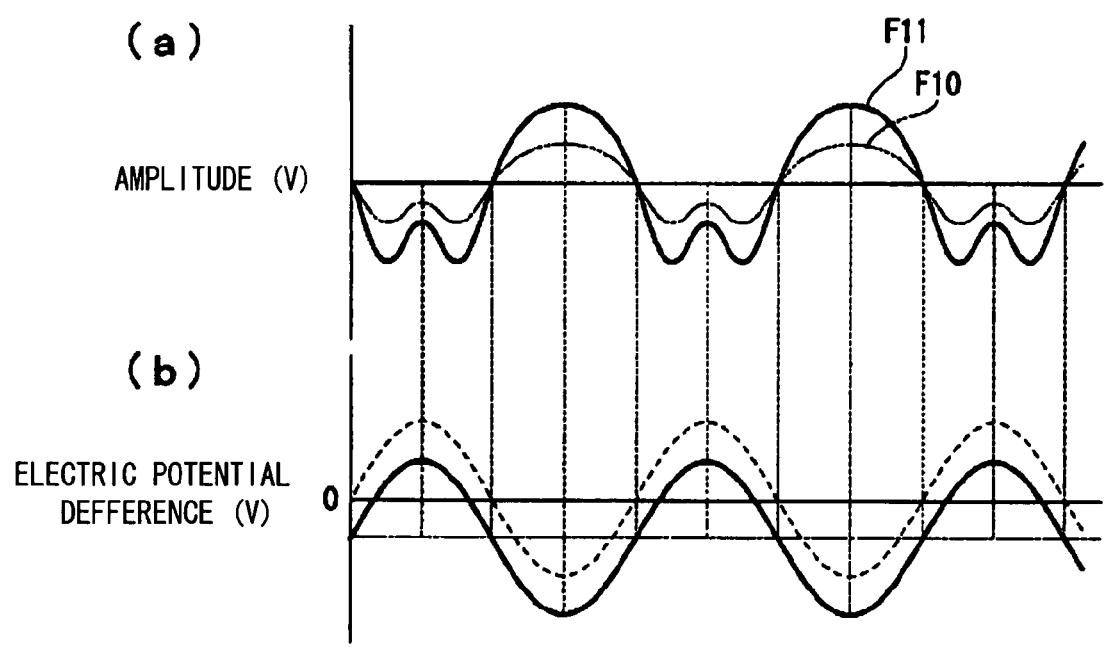
FIG. 15 is a graph showing the vibration waveform of the cantilever in the third modified example of the electric potential difference detection method in the first embodiment of this invention, and a graph showing the waveform of the electric potential difference between the sample surface and the probe of the cantilever in the same.

FIG. 13 to FIG. 15 show a third modified example of the electric potential difference detection method, and show about a case where a distance between the sample surface S1 and the probe 3a of the cantilever 3 is changed. As shown in FIG. 13, it is supposed that the sample S is measured while being made an initial position B1. In FIG. 14, an AC voltage E8 and a vibration waveform F8 show detection results in the case where there is made the initial position B1. And, it is supposed that an amplitude A8 of the vibration waveform F8 is small, and the amplitude cannot be detected in the detection process. In the case like this, as shown in FIG. 13, the control section 33 drives the Z drive section 23 to thereby shorten the distance between the sample surface S1 and the probe 3a of the cantilever 3, and sets the sample S to a position B2. In this manner, if the AC voltage E8 is applied again in the voltage application process, the electrostatic attraction force becomes large even at the same amplitude V8. Therefor, an amplitude A9 of a vibration frequency F9 to be obtained becomes one larger than the amplitude A8 of the vibration waveform F8, so that it becomes possible to accurately detect the amplitude in the detection process and accurately judge the existence/nonexistence of the electric potential difference in the analysis process. Although FIG. 15 shows a case where the AC voltage is applied at the frequency larger than the electric potential difference in an initial state, similarly also in this case, there becomes clear from a vibration waveform F10 to a vibration waveform F11 of the cantilever 3 by shortening the distance between the sample surface S1 and the probe 3a of the cantilever 3, so that it is possible to accurately judge the existence/nonexistence of the electric potential difference. Especially, depending on a shape and a material, although the cantilever, whose rigidity is high, is difficult to be deformed and becomes small in the amplitude, also in the cantilever like this, it becomes possible to accurately detect the electric potential difference by the method of the present modified example.

Here, in FIG. 13, it is desirable that a separation distance H between the probe 3a of the cantilever 3 and the sample surface S1 is set below 1 mm. By the fact that, when stating the voltage application process, the control section 33 drives the Z scanner 21 of the movement member 5 to thereby set the separation distance H between the probe 3a of the cantilever 3 and the sample surface S1 below 1 mm, it is possible to precisely detect the electric potential difference like the above. Further, the control section 33 may be made one which, when starting the voltage application process, causes the probe 3a of the cantilever 3 to separate in regard to the sample surface S1 by a previously set distance with a measurement position being made a reference after a position of the probe 3a of the cantilever 3 is set to the measurement position capable of measuring the sample surface S1. By making like this, it is possible to detect the electric potential difference with a good reproducibility. Incidentally, by the fact that the piezoelectric element is used as the movement member 5, it is possible to precisely set the separation distance between the probe 3a of the cantilever 3 and the sample surface S, thereby expecting the good reproducibility.

Second Embodiment

FIG. 16 to FIG. 19 show a second embodiment concerned with this invention. In this embodiment, the same reference numeral is applied to a member common to the member used in the above-mentioned embodiment, and its explanation is omitted.

Figure 16:
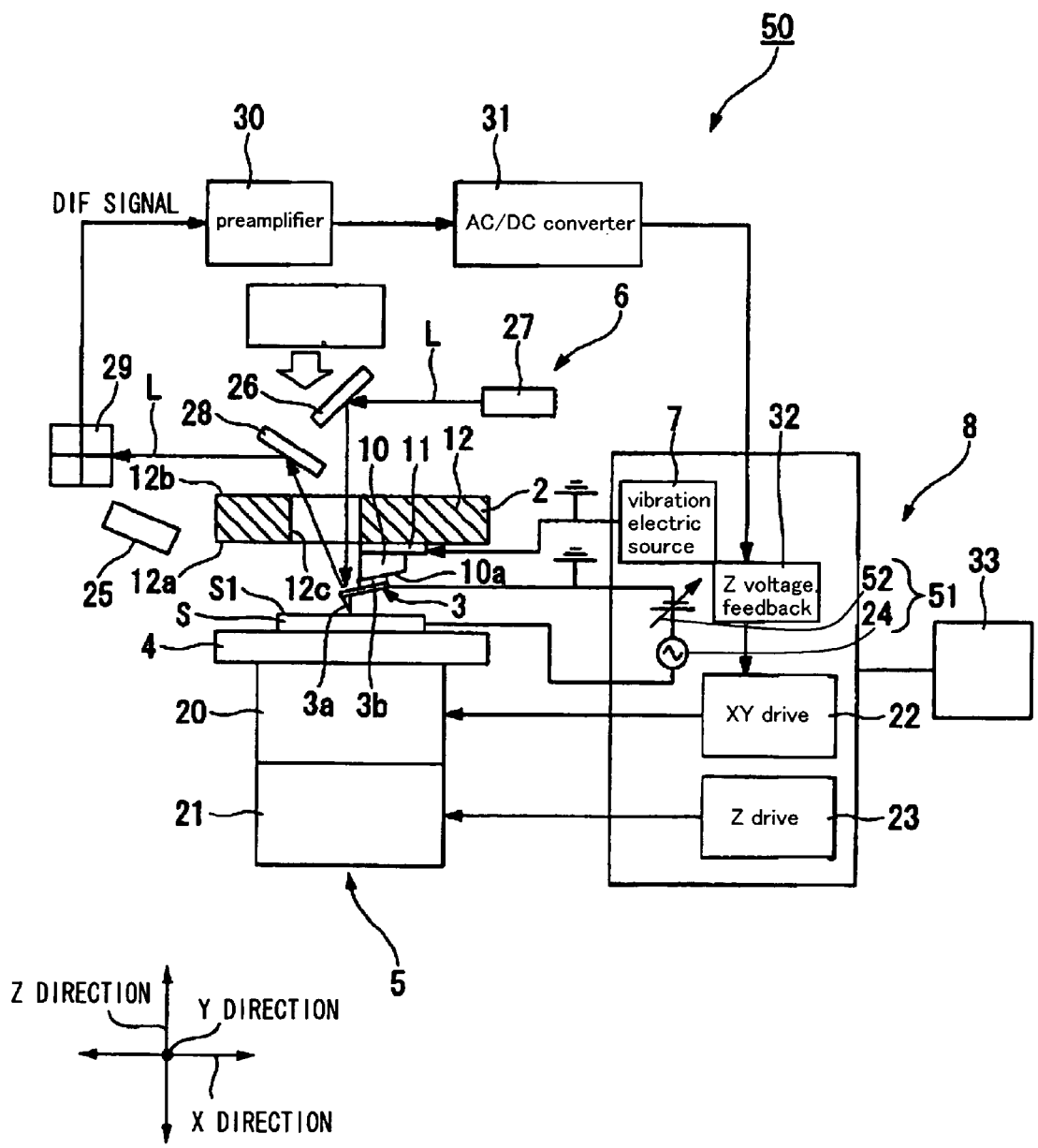
FIG. 16 is a constitutional diagram of a scanning probe microscope in a second embodiment of this invention.

As shown in FIG. 16, in a scanning probe microscope 50 of this embodiment, as a voltage application member 51, between the sample S and the cantilever 3, a DC electric source 52 is connected together with the AC signal generator 24. Therefor, in a voltage detection process, by the voltage application member 51, it is possible to apply a DC voltage together with the AC voltage while being superimposed. Next, there are explained about a detection method of the electric potential difference and an observation method of the sample on the basis of the detection result in the scanning probe microscope 50.

Figure 17:
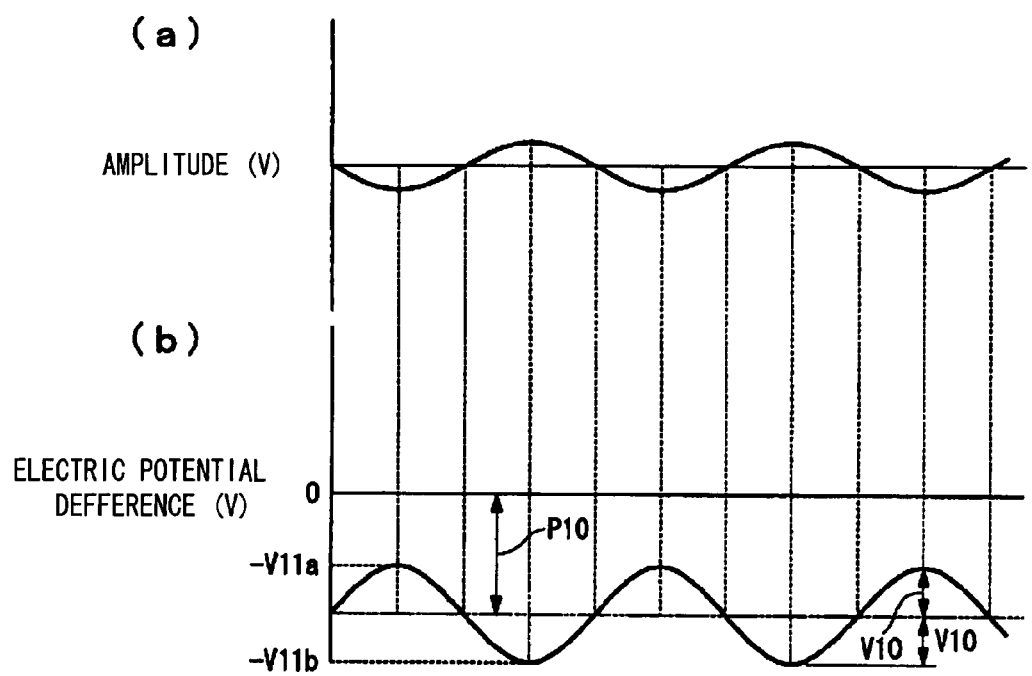
FIG. 17 is a graph showing the vibration waveform of the cantilever as a first pattern in the second embodiment of this invention, and a graph showing the waveform of the electric potential difference between the sample surface and the probe of the cantilever as the same.

First, as shown in FIG. 17, only the AC voltage is applied without applying the DC voltage. It is supposed that an amplitude of the AC voltage at this time is V10, and an electric potential difference P10 in the initial state is larger than the amplitude V10. Therefor, as to the electric potential difference occurring between the sample surface S1 and the probe 3a of the cantilever 3, only the minus voltage periodically occurs between $-V11a$ ($=-P10+V10$) and $-V11b$ ($=-P10-V10$) Therefor, from the detection result obtained in the detection process, in the analysis process the control section 33 judges that the electric potential difference exists between the sample surface S1 and the probe 3a of the cantilever 3, and next repeatedly performs the voltage application process, the detection process and the analysis process by applying the DC voltage with the AC voltage being superimposed. And, the control section 33 causes a magnitude of the DC voltage by the DC electric source 52 to gradually change and, in a case where the composite wave of plural waveforms whose amplitudes differ is detected in the vibration waveform of the cantilever 3, causes the detection of the electric potential difference to finish.

Figure 18:
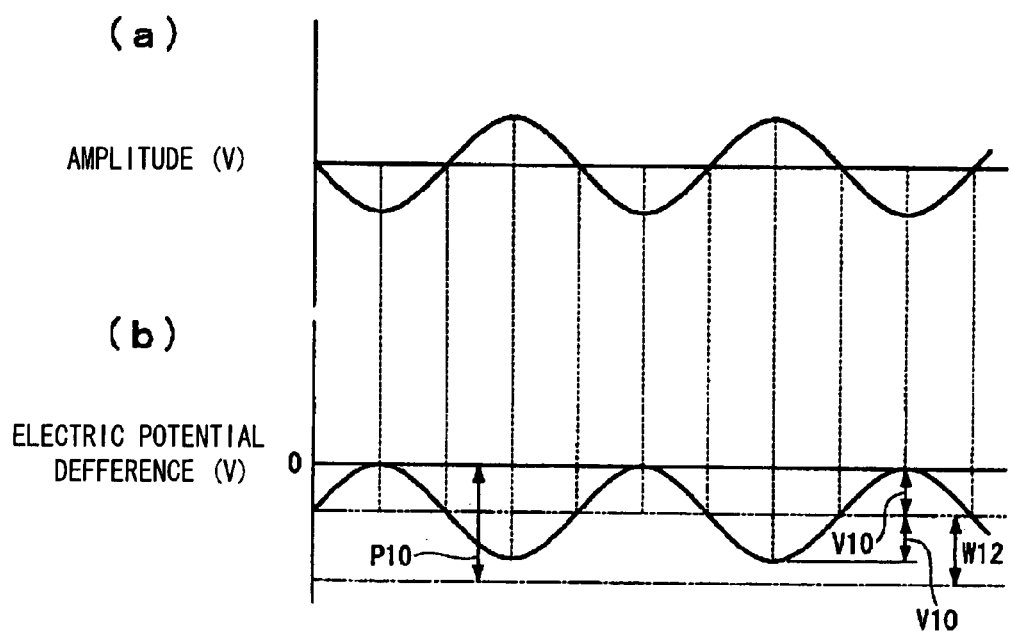
FIG. 18 is a graph showing the vibration waveform of the cantilever as a second pattern in the second embodiment of this invention, and a graph showing the waveform of the electric potential difference between the sample surface and the probe of the cantilever as the same.
Figure 19:
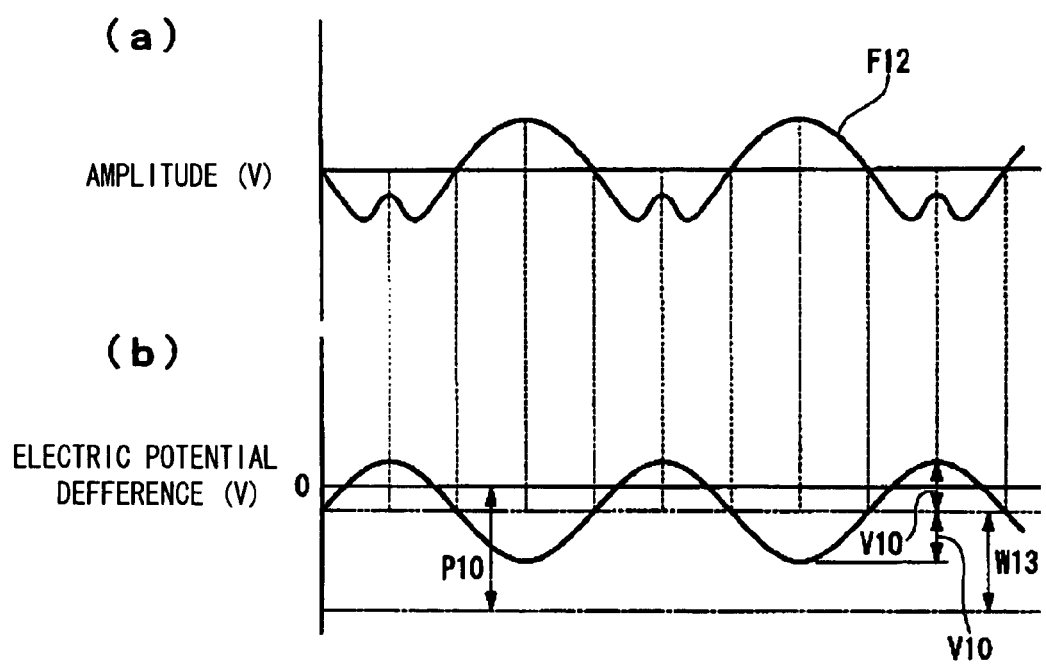
FIG. 19 is a graph showing the vibration waveform of the cantilever as a third pattern in the second embodiment of this invention, and a graph showing the waveform of the electric potential difference between the sample surface and the probe of the cantilever as the same.

As shown in FIG. 18 and FIG. 19, in a DC voltage W13 of FIG. 19, in which a sum of the amplitude of the AC voltage and the DC voltage becomes larger than the electric potential difference P10 by the fact that the magnitudes of the DC voltages to be applied are enlarged as large as W12 and W13, it follows that a composite wave F12 is detected. That is, in a case where the control section 33 detects the composite wave in the analysis process, in other words, in a case where there is made larger than the DC voltage W12 shown in (b) of FIG. 18, the detection of the electric potential difference is finished and, by extracting a sum of the amplitude V10 of the AC voltage applied in the final electric potential difference detection process and the DC voltage W12, this sum and the electric potential difference P10 between the sample surface S1 and the probe 3a of the cantilever 3 become approximately equal, so that it is possible to quantitatively detect the electric potential difference P10.

Next, the control section 33 causes the AC signal generator 24 within the voltage application member 51 to stop, and sets the DC voltage, which is applied by the DC electric source 52, to a magnitude different in plus and minus with its absolute value being made equal to the detected electric potential difference P10. By this, there becomes a state in which the electric potential difference P10 occurring between the sample surface S1 and the probe 3a of the cantilever 3 is cancelled. Therefor, under this state, if the collenction of the measurement data of the sample S is started by vibrating the vibration source 11, it is possible to observe without undergoing the influence of the electric potential difference, so that it is possible to accurately observe the sample S.

Figure 20:
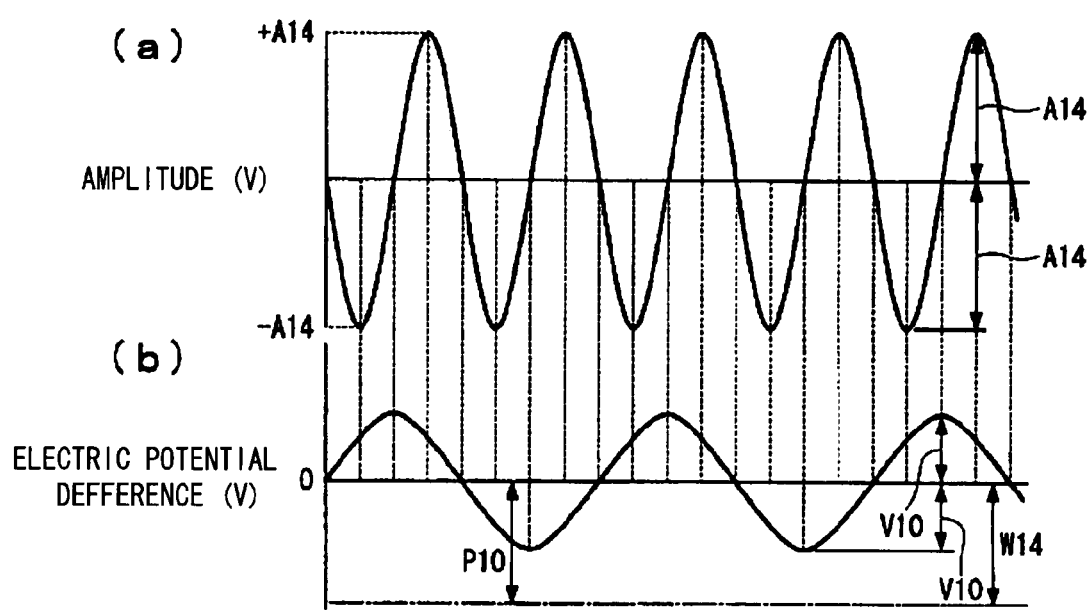
FIG. 20 is a graph showing the vibration waveform of the cantilever as a modified example of an electric potential difference detection method in a second embodiment of this invention, and a graph showing the waveform of the electric potential difference between the sample surface and the probe of the cantilever as the same.

FIG. 20 shows a modified example of the electric potential difference detection method detecting the electric potential difference occurring between the sample surface S1 and the probe 3a of the cantilever 3 in the present embodiment. As shown in (b) of FIG. 20, in a case where there is applied a DC voltage W14 approximately equal to the electric potential difference P10, the electric potential difference P10 is cancelled, and there becomes a state in which the electric potential difference occurs between the probe 3a of the cantilever 3 and the sample surface S1 only by the AC voltage. Therefor the cantilever 3 becomes the resonance state, and its amplitude A14 shows a maximum value. That is, in the case where there is detected such a composite wave F12 as shown in (a) of FIG. 19, the control section 33 causes the magnitude of the DC voltage by the DC electric source 52 to gradually change additionally. And, in a case where the amplitude detected by the measurement member 6 shows the maximum value, the control section 33 can quantitatively detect the electric potential difference P10 by extracting the DC voltage W14 at that time.

Next, the control section 33 causes the AC signal generator 24 within the voltage application member 51 to stop, and sets, the DC voltage applied by the DC electric source 52 to the DC voltage W14 applied when the amplitude A14 of the cantilever, 3 shows the maximum value. By this, there becomes the state in which the electric potential difference P10 occurring between the sample surface S1 and the probe 3a of the cantilever 3 is cancelled. Therefor, under this state, if the collection of the measurement data of the sample S is started by vibrating the vibration source 11, it is possible to observe without undergoing the influence of the electric potential difference, so that it is possible to accurately observe the sample S.

In the above, although there are detailedly mentioned about the embodiments of the present invention by referring to the drawings, a concrete constitution is not one limited to these embodiments, and there are included also a design modification in a scope not deviating from a gist of the present invention, and the like.

What is claimed is:

1. An electric potential difference detection method for detecting an electric potential difference between a surface of a sample and a probe of a cantilever using a scanning probe microscope comprising the cantilever and a sample base mounting the sample so as to confront the probe of the cantilever, the method comprising:

a voltage application step that applies, between the surface of the sample and the cantilever, an AC voltage having a frequency that is ½ of a resonance frequency of the cantilever;

a detection step that detects a magnitude of an amplitude of the cantilever following the voltage application step; and an analysis step that judges, on the basis of the detected vibration characteristics of the cantilever, an existence of an electric potential difference between the surface of the sample and the probe of the cantilever in a case where the cantilever is not resonating and the detected magnitude of the amplitude of the cantilever is smaller than a predetermined magnitude.

2. An electric potential difference detection method according to claim 1; wherein when it is judged in the analysis step that the electric potential difference exists between the surface of the sample and the probe of the cantilever, an amplitude of the AC voltage is gradually increased in the voltage application step, thereby repeatedly performing the voltage application step, the detection step and the analysis step; and wherein when a composite wave comprised of plural waveforms with different amplitudes is detected in the detection step, detection of the electric potential between the surface of the sample and the probe of the cantilever is finished and a magnitude of the amplitude of the AC voltage applied in the voltage application step is extracted in the analysis step.

3. An electric potential difference detection method according claim 1; wherein when it is judged in the analysis step that the electric potential difference exists between the surface of the sample and the probe of the cantilever, a DC voltage is applied together with the AC voltage in the voltage application step and the DC voltage is gradually changed, thereby repeatedly performing the voltage application step, the detection step and the analysis step; and wherein when a composite wave comprised of plural waveforms with different amplitudes is detected in the detection step, detection of the electric potential between the surface of the sample and the probe of the cantilever is finished and a sum of a magnitude of the DC voltage applied in the voltage application step and a magnitude of the amplitude of the AC voltage are extracted in the analysis step.

4. An electric potential difference detection method according claim 1; wherein when it is judged in the analysis step that the electric potential difference exists between the surface of the sample and the probe of the cantilever, a DC voltage is applied together with the AC voltage in the voltage application step and the DC voltage is gradually changed, thereby repeatedly performing the voltage application step, the detection step and the analysis step; and wherein in a case where a composite wave comprised of plural waveforms with different amplitudes is detected in the detection process, when a vibration amplitude of the cantilever, which is detected in the detection step by additionally changing the DC voltage in the voltage application step, reaches a maximum value, a magnitude of the DC voltage applied in the voltage application step is extracted in the analysis step as the electric potential difference between the surface of the sample and the probe of the cantilever.

5. An electric potential difference detection method according to claim 1; wherein at the start of the voltage application step, a separation distance between the probe of the cantilever and the surface of the sample is set below 1 mm.

6. An electric potential difference detection method according to claim 1; wherein at the start of the voltage application step, after a position of the probe of the cantilever is set to a measurement position for measuring the surface of the sample, the probe of the cantilever is separated from the surface of the sample by a previously set distance with the measurement position being set a reference.

7. An electric potential difference detection method according to claim 6; wherein in a state in which the probe of the cantilever is separated from to the surface of the sample, the sample and the cantilever are moved relative one another by deformation of a piezoelectric member.

8. An electric potential difference detection method for detecting an electric potential difference between a surface of a sample and a probe of a cantilever using a scanning probe microscope comprising the cantilever and a sample base mounting the sample so as to confront the probe of the cantilever, the method comprising:
   a voltage application step that applies, between the surface of the sample and the cantilever, an AC voltage having a frequency that is ½ of a resonance frequency of the cantilever;
   a detection step that detects a magnitude of an amplitude of the cantilever following the voltage application step; and
   an analysis step that judges, on the basis of the detected vibration characteristics of the cantilever, a nonexistence of an electric potential difference between the surface of the sample and the probe of the cantilever in a case where the cantilever is resonating and the detected magnitude of the amplitude of the cantilever is greater than a predetermined magnitude.

9. An electric potential difference detection method for detecting an electric potential difference between a surface of a sample and a probe of a cantilever using a scanning probe microscope comprising the cantilever and a sample base mounting the sample so as to confront the probe of the cantilever, the method comprising:
   a voltage application step that applies, between the surface of the sample and the cantilever, an AC voltage having a frequency that is ½ of a resonance frequency of the cantilever;
   a detection step that detects a frequency of the cantilever following the voltage application step; and
   an analysis step that judges, on the basis of the detected vibration characteristics of the cantilever, an existence of an electric potential difference between the surface of the sample and the probe of the cantilever in a case where the cantilever is not resonating and the detected frequency of the cantilever is not a resonance frequency of the cantilever.

10. A scanning probe microscope comprising:
   a cantilever having a probe;
   a sample base mounting a sample so as to confront the probe of the cantilever;
   a movement member that moves the sample and the cantilever relative one another;
   a measurement member that detects a displacement and a magnitude of an amplitude of the cantilever;
   a voltage application member that applies an AC voltage between the sample and the cantilever; and
   a controller that controls the voltage application member to apply between the sample and the cantilever an AC voltage having a frequency that is ½ of a resonance frequency of the cantilever, determines an existence/nonexistence of an electric potential difference between the surface of the sample and the probe of the cantilever on the basis of a detection result from the measurement member, and collects observation data from a surface of the sample when it is determined that the electric potential difference does not exist between the surface of the sample and the probe of the cantilever;
   wherein in a case where a vibration amplitude of the cantilever is above a predetermined magnitude and the cantilever is resonating, the controller determines that the electric potential difference does not exist between the surface of the sample and the probe of the cantilever, thereby starting the collection of the observation data from the surface of the sample.

11. A scanning probe microscope according to claim 10; wherein in a case where the controller determines, on the basis of the vibration characteristics of the cantilever, that the electric potential difference exists between the surface of the sample and the probe of the cantilever, an amplitude of the AC voltage applied by the voltage application member is caused to gradually increase, thereby causing the vibration characteristics of the cantilever to be repeatedly detected by the measurement member, and, in a case where a composite wave of plural waveforms whose amplitudes differ is detected in a vibration waveform of the cantilever, the controller extracts a magnitude of the amplitude of the AC voltage finally applied by the voltage application member as the electric potential difference between the surface of the sample and the probe of the cantilever.

12. A scanning probe microscope according to claim 10; wherein the voltage application member applies a DC voltage with the AC voltage being superimposed; and wherein in a case where the controller determines, on the basis of the vibration characteristics of the cantilever, that the electric potential difference exists between the surface of the sample and the probe of the cantilever, the controller controls the voltage application member to apply the DC voltage together with the AC voltage to thereby gradually change the DC voltage, thereby causing the vibration characteristics of the cantilever to be repeatedly detected by the measurement member, and, in a case where a composite wave of plural waveforms whose amplitudes differ is detected in a vibration waveform of the cantilever, the controller extracts a sum of a magnitude of the DC voltage finally applied by the voltage application member and a magnitude of the amplitude of the AC voltage as the electric potential difference between the surface of the sample and the probe of the cantilever.

13. A scanning probe microscope according to claim 12; wherein in a case where the controller extracts the sum of the magnitude of the DC voltage and the magnitude of the amplitude of the AC voltage as the electric potential difference between the surface of the sample and the probe of the cantilever, the controller starts collection of the observation data under a state in which by the controller controls the voltage application member to apply the DC voltage different in plus and minus with its absolute value being made equal to the electric potential difference.

14. A scanning probe microscope according to claim 10; wherein the voltage application member applies a DC voltage with the AC voltage being superimposed; and wherein in a case where the controller determines, on the basis of the vibration characteristics of the cantilever, that the electric potential difference exists between the surface of the sample and the probe of the cantilever, the controller controls the voltage application member to apply the DC voltage together with the AC voltage to thereby gradually change the DC voltage, thereby causing the vibration characteristics of the cantilever to be repeatedly detected by the measurement member, and, in a case where a composite wave of plural waveforms whose amplitudes differ is detected in a vibration waveform of the cantilever, when a vibration amplitde of the cantilever, which is detected by additionally changing the DC voltage by the voltage application member, reaches a maximum value, the controller extracts a magnitude of the DC voltage applied by the voltage application member as the electric potential difference between the surface of the sample and the probe of the cantilever.

15. A scanning probe microscope according to claim 14; wherein in a case where the controller extracts the magnitude of the DC voltage as the electric potential difference between the surface of the sample and the probe of the cantilever, the controller starts collection of the observation data under a state in which the DC voltage is applied by the voltage application member.

16. A scanning probe microscope according to claim 10; wherein in a case where the controller controls the voltage application member to apply the AC voltage in order to determine the existence/nonexistence of the electric potential difference between the surface of the sample and the probe of the cantilever, the controller controls the movement member to move the cantilever and the sample relative one another so that a separation distance between the probe of the cantilever and the surface of the sample is set below 1 mm.

17. A scanning probe microscope according to claim 10; wherein in a case where the controller controls the voltage application member to apply the AC voltage in order to judge an existence/nonexistence of the electric potential difference between the surface of the sample and the probe of the cantilever, the controller controls the movement member to set the probe of the cantilever to a measurement position for measuring the surface of the sample and thereafter controls the movement member to separate the probe of the cantilever relative to the surface of the sample by a previously set distance with the measurement position being made a reference.

18. A scanning probe microscope according to claim 17; wherein the movement member comprises a piezoelectric element that undergoes deformation by application of a voltage, and the probe of the cantilever is separated relative to the surface of the sample by deformation of the piezoelectric element.

19. A scanning probe microscope according to claim 10; further comprising a vibration source that undergoes vibration by application thereto of an AC voltage to cause the cantilever to vibrate at a predetermined frequency, a vibration electric source switchable between a state for applying the AC voltage to the vibration source and a state for applying the AC voltage between the sample and the cantilever as the voltage application member, and a switch for switching the vibration electric source between the state for applying the AC voltage to the vibration source and the state for applying the AC voltage between the sample and the cantilever as the voltage application member.

20. A scanning probe microscope according to claim 10; further comprising an electrification removal member for removing an electrification of the sample; wherein when the controller determines that the electric potential difference exists between the surface of the sample and the probe of the cantilever, the controller controls the electrification removal member to remove an electrification of the sample.

21. A scanning probe microscope comprising:
a cantilever having a probe;
a sample base mounting a sample so as to confront the probe of the cantilever;
a movement member that moves the sample and the cantilever relative one another;
a measurement member that detects a displacement and a frequency of the cantilever;
a voltage application member that applies an AC voltage between the sample and the cantilever; and
a controller that controls the voltage application member to apply between the sample and the cantilever an AC voltage having a frequency that is ½ of a resonance frequency of the cantilever, determines an existence/nonexistence of an electric potential difference between the surface of the sample and the probe of the cantilever on the basis of a detection result from the measurement member, and collects observation data from a surface of the sample when it is determined that the electric potential difference does not exist between the surface of the sample and the probe of the cantilever;
wherein in a case where a vibration amplitude of the cantilever is a resonance frequency of the cantilever and the cantilever is resonating, the controller determines that the electric potential difference does not exist between the surface of the sample and the probe of the cantilever, thereby starting the collection of the observation data from the surface of the sample.

22. An electric potential difference detection method for detecting an electric potential difference between a surface of a sample and a probe of a cantilever of a scanning probe microscope, comprising the steps of:
applying between the sample and the cantilever an AC voltage having a frequency that is ½ of a resonance frequency of the cantilever;
detecting a magnitude of an amplitude of vibration of the cantilever; and
determining whether an electric potential difference exists or does not exist between the surface of the sample and the probe of the cantilever on the basis of the detected magnitude of the amplitude of vibration of the cantilever;
wherein the determining step determines that an electric potential difference between the surface of the sample and the probe of the cantilever does not exist in a case where the cantilever is resonating and the detected magnitude of the amplitude of vibration of the cantilever is greater than a predetermined magnitude; and
wherein the determining step determines that an electric potential difference between the surface of the sample and the probe of the cantilever exists in a case where the cantilever is not resonating and the detected magnitude of the amplitude of vibration of the cantilever is smaller than a predetermined magnitude.

23. A scanning probe microscope comprising:
a cantilever having a probe;
a sample base mounting a sample so as to confront the probe of the cantilever;
a movement member that moves the sample and the cantilever relative one another;
a measurement member that detects a displacement and a magnitude of an amplitude of vibration of the cantilever;
a voltage application member that applies an AC voltage between the sample and the cantilever; and
a controller that controls the voltage application member to apply between the sample and the cantilever an AC voltage having a frequency that is ½ of a resonance frequency of the cantilever, determines an existence/nonexistence of an electric potential difference between the surface of the sample and the probe of the cantilever on the basis of a detection result from the measurement member, and collects observation data from a surface of the sample when it is determined that the electric potential difference does not exist between the surface of the sample and the probe of the cantilever;
wherein in a case where the detected magnitude of the amplitude of vibration of the cantilever is above a predetermined magnitude and the cantilever is resonating, the controller determines that the electric potential difference does not exist between the surface of the sample and the probe of the cantilever, thereby starting the collection of the observation data from the surface of the sample; and wherein in a case where the detected magnitude of the amplitude of vibration of the cantilever is a resonance frequency of the cantilever and the cantilever is resonating, the controller determines that the electric potential difference does not exist between the surface of the sample and the probe of the cantilever, thereby starting the collection of the observation data from the surface of the sample.

* * * * *